United States Patent [19]
Limberg

[11] Patent Number: 5,467,145
[45] Date of Patent: Nov. 14, 1995

[54] CIRCUITRY FOR ENHANCING DETAIL IN COLOR VIDEO SIGNALS

[75] Inventor: Allen L. Limberg, Vienna, Va.

[73] Assignee: Samsung Electronics Co., Ltd., Suwon, Rep. of Korea

[21] Appl. No.: 330,164

[22] Filed: Oct. 26, 1994

[51] Int. Cl.⁶ .............................. H04N 5/21; H04N 5/208
[52] U.S. Cl. ..................... 348/628; 348/629; 348/630
[58] Field of Search ...................... 348/627, 628, 348/629, 630, 631, 625, 626, 606, 607, 618, 619, 621, 622, 645, 646, 647, 644, 252, 253; H04N 5/208, 9/68, 5/21

[56] References Cited

U.S. PATENT DOCUMENTS

| | | | |
|---|---|---|---|
| 3,732,360 | 5/1973 | Breimer et al. | 348/253 |
| 3,743,766 | 7/1973 | Loose et al. | 348/253 |
| 4,142,211 | 2/1979 | Faroudja | 348/623 |
| 4,677,461 | 6/1987 | Mizutani et al. | 348/630 |
| 4,825,289 | 4/1989 | Ohta | 348/622 |
| 5,124,787 | 6/1992 | Lee et al. | 348/630 |
| 5,218,438 | 6/1993 | Kim | 348/253 |

FOREIGN PATENT DOCUMENTS

| | | | |
|---|---|---|---|
| 0517474 | 12/1992 | European Pat. Off. | H04N 5/208 |
| 0071772 | 4/1986 | Japan | H04N 5/208 |
| 0295786 | 12/1986 | Japan | 358/37 |

*Primary Examiner*—James J. Groody
*Assistant Examiner*—Michael H. Lee
*Attorney, Agent, or Firm*—Stephen R. Whitt; Charles R. Donohoe

[57] ABSTRACT

In video signal processing circuitry detail enhancement is done on each of three color channels in response to the detail information, the enhancement of the detail in each color channel being done in reliance on separated high-spatial-frequency information originally contained in one or more of the channels. The high-spatial-frequency information is separated by differentially combining a fullband video signal with that signal as filtered by a cascade connection of vertical lowpass filter and horizontal lowpass filter.

25 Claims, 14 Drawing Sheets

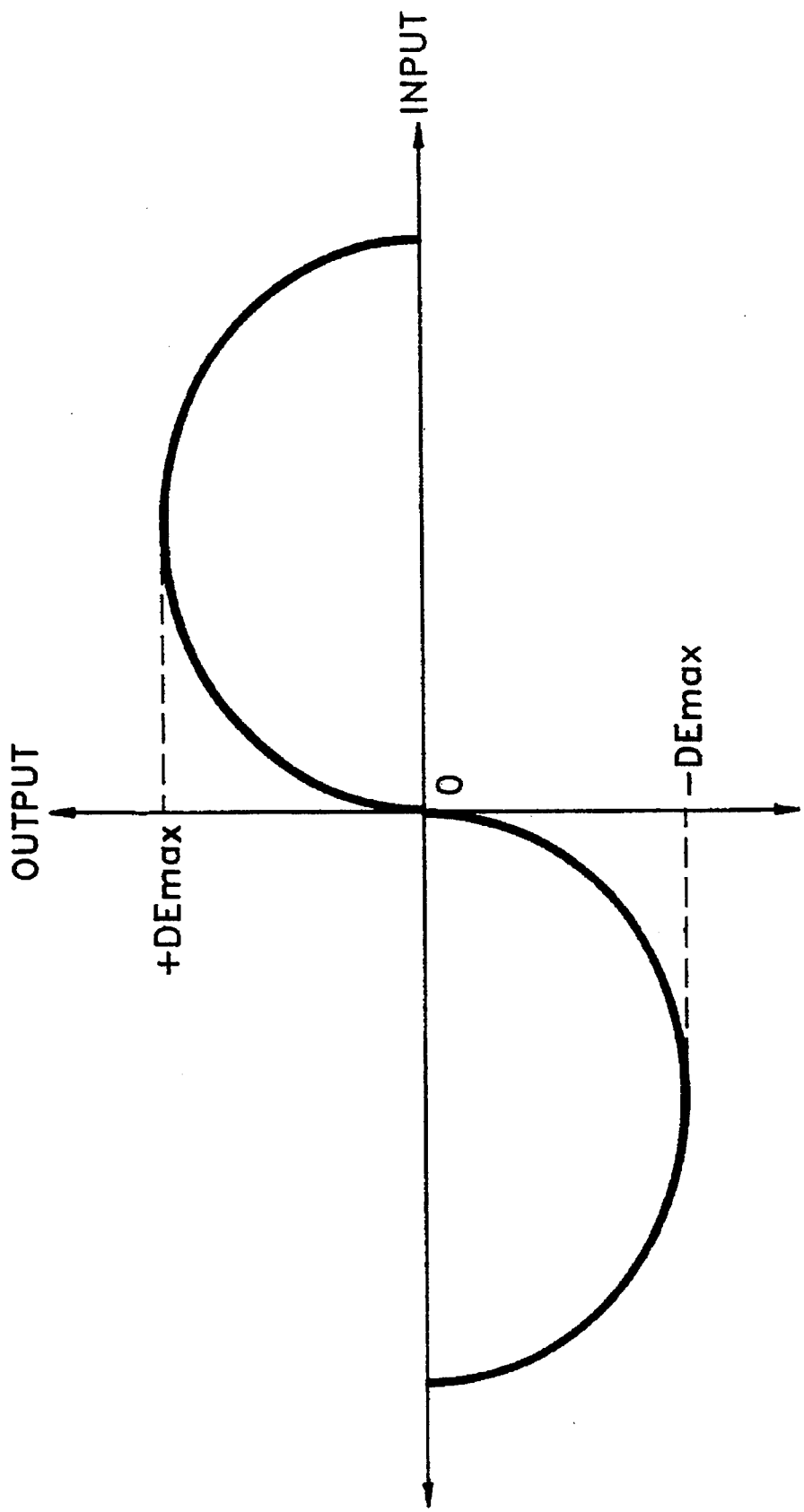

CIRCUITRY FOR ENHANCING DETAIL IN COLOR VIDEO SIGNALS

The present invention relates to a method for enhancing detail in color signals and circuitry for implementing that method in color video equipment, such as color video cameras.

RELATED APPLICATIONS

A U.S. patent application Ser. No. 08/330,705 entitled METHOD FOR ENHANCING DETAIL IN COLOR SIGNALS & CIRCUITRY FOR IMPLEMENTING THAT METHOD IN COLOR VIDEO EQUIPMENT was filed 26 Oct. 1994 by Hyo-seung Lee, who like the inventor of the inventions claimed herein was at the time his invention was made an employee of Samsung Electronics Co., Ltd., or one of its subsidiaries and was obligated at the time his inventions were made to assign his inventions to Samsung Electronics Co., Ltd.

BACKGROUND OF THE INVENTION

Spatial frequency is a measure of how rapidly a parameter changes over distance in a prescribed spatial direction and is analogous to temporal frequency, which is a measure of how rapidly a parameter changes with the passage of time. In television systems using horizontal scanning lines, horizontal space is conformally mapped to time by the scanning process, so horizontal spatial frequency of the televised image intensity conformally maps to temporal frequency in the video signal descriptive of the televised image. customarily contains stripes transmitting light of three different colors to the pickup device which may be a vidicon or may be a solid-state imager such as line-transfer charge-coupled device. The direction of the stripes is perpendicular to the direction of line scan in the camera line scan conventionally being in a horizontal direction. The stripes of each color are of uniform width but the stripes of different colors are preferably of different widths to simplify the separation of color components from the output signal of the pickup device. The respective widths associated with the different colors are usually scaled in regard to the contribution of the particular color to luminance—that is, to reference white. If the color filter comprises red-transmissive, green-transmissive and blue-transmissive stripes for example the green-transmissive stripes will be the widest and the blue-transmissive stripes will be the narrowest. The signals picked up by the narrower width stripes have poorer signal-to-noise ratio (S/N), particularly in the higher horizontal spatial frequencies containing detail. When the video camera is used with a video transmission system where the color signals are converted to wideband luminance and narrowband color-difference signals, the poorer S/N of the colors contributing less to luminance is not of much concern, since detail enhancement or video peaking is usually carried out on the shared luminance high frequencies rather than on individual color signals.

However, the video camera can be used with video equipment in which the color signals are not combined to form luminance and color-difference signals—e.g. certain digital video transmission systems of tile so-called RGB type where the red (R), green (G) and blue (B) color signals are separately digitized and coded. In such equipment detail enhancement or video peaking is apt to be done on the red (R), green (G) and blue (B) color signals themselves. Since the human visual system discriminates poorly between colors of detail as details become finer, the enhancement of the color details that have poorer S/N with the color details that have better S/N can result in images that have less apparent noise in them. Random noise in the green (G) color signal is not correlated with random noise in the red (R) and blue (B) color signals, so on average tile random noise component of the G signal and the random noise component of another color signal add as quadrature vectors rather than in-phase vectors, which apparently helps the high-frequency S/N when enhancing the detail of that other color signal.

FIG. 1 shows detail enhancement circuitry used in the prior art, in which an image signal input to the green (G) channel is delayed by cascaded first and second delay lines 1 and 2, each providing a delay equal to the duration (1H) of a horizontal scan line. Thereafter, the original (undelayed) image signal, a first output image signal delayed by 1H period by the first 1H delay line 1, and a second output image signal delayed 2H periods by means of the first and second 1H delay lines 1 and 2 are applied to a vertical highpass filter (V HPF) weight-and-sum circuit 3 for extracting a vertical detail component. Meanwhile, the 1H-delayed image signal delayed by the first 1H delay line is also applied to a horizontal highpass filter (H HPF) 4, thereby extracting a horizontal detail component.

The vertical detail component output from the V HPF 3 is filtered by a horizontal lowpass filter (H LPF) 5 to prevent diagonal detail from being excessively enhanced, as will be explained in more detail further on in this specification. Then, the detail components respectively extracted by H HPF 4 and by H LPF 5 are summed in an adder 6, to be applied as addressing to a read-only memory (ROM) 7 storing a look-up table (LUT).

The LUT stored in ROM 7 executes a process having a transfer characteristic which is related to the detail component level of the image signal. This process may take several forms, ranging from a simple linear amplification of the detail component to a non-linear attenuation of the noise component included in the detail component. Such a process can also include coring of the detail component at a level somewhat above its thermal noise level, thus providing an image signal in which thermal noise is suppressed to the detail-enhanced signal supplying means composed of second, third and fourth adders 8, 9 and 10. Also, the LUT stored in ROM 7 can execute a non-linear coring process. That is to say, input levels lower than the thermal noise level are set to zero while those higher than the thermal noise level are amplified to enhance the detail, and those much higher than the thermal noise level are attenuated to prevent over-enhancement of the detail.

The detail enhancement component supplied by the ROM 7 is added to each of the image signals of the red (R) and blue (B) channels, and to the output signal of the first delay line 1, in the second, third and fourth adders 8, 9 and 10, respectively. The summed image signals are then output as red, green and blue detail-enhanced signals R', G' and B' for the respective channels.

The detail enhancement circuit shown in FIG. 1 is designed such that, using H LPF 5, a diagonal detail component is not overly enhanced. That is to say, when bright pixels are distributed horizontally in the P1, P2 and P3 pixel positions in the 1H line, as shown in FIG. 2A, the vertical detail component associated with these pixels is detected, by V HPF 3; and there is no horizontal detail component associated with these pixels to be detected by H HPF 4. When bright pixels are distributed vertically in the P2 pixel position of the 0H, 1H and 2H lines, as shown in FIG. 2B, the horizontal detail component associated with these pixels is detected by H HPF 4 and there is no vertical detail component associated with these pixels to be detected by V HPF 3. However, when bright pixels are distributed diagonally, as shown in FIG. 2C, the vertical detail component associated with these pixels is detected by V HPF 3 and the horizontal detail component detail component associated with these pixels is detected by H HPF 4. So diagonal detail enhancement is excessive if done in response to the summed responses of V HPF 3 and H HPF 4. Accordingly, a horizontal lowpass filter (H LPF) 5 is connected in cascade after V HPF 3 to perform a lowpass filtering operation that suppresses the vertical detail component when it is associated with a horizontal detail component and thereby curbs the undesirable tendency towards excessive detail enhancement. Isolated pixels differing from their neighbors are still enhanced excessively, however.

Delay (not shown in FIG. 1) must be included in the G input connection to the fourth adder 10 from the output connection of the 1H delay line 1, in order to compensate for delay through H HPF 4; this delay can be provided by tapping the delay line 2, or replacing it by cascaded delay lines that in effect provide a tapped delay line 2. Respective delay lines (not shown in FIG. 1) are customarily included in the R input connection to the second adder 8 and in the B input connection to the third adder 9 to provide delays of the R and B signals compensating for the delay of the G signal as supplied to the fourth adder 10. The delay through H LPF 5 can compensate for the delay through H HPF 4.

In an alternative design for curbing the undesirable tendency towards excessive detail enhancement, which does not use H LPF 5, but instead supplies input signal to H HPF 4 from a vertical lowpass filter receiving input signals similar to V HPF 3, additional compensating delay has to be introduced after V HPF 3 and in each of the R, G and B inputs to the adders 8, 9 and 10. The FIG. 1 prior-art design for curbing the undesirable tendency towards excessive detail enhancement is the preferred one of these two equivalents because of its reduced requirement for compensating delay, particularly after V HPF 3.

There are problems with the FIG. 1 detail enhancement circuit having to do with detail enhancement, or peaking, reducing the signal-to-noise ratio (S/N) of images reproduced from the red, green and blue enhanced-detail signals R', G' and B'. This is the reason that the measurement of the S/N ratio of devices including a detail enhancement circuit (e.g., a camera) is customarily done so that detail enhancement is not done at the same time. The human visual system tends to ignore reduced S/N in the presence of detail, but is quite sensitive to high-spatial-frequency noise occurring in areas of an image where there is relatively little detail. Arranging for the LUT stored in the ROM 7 to supply a cored video detail signal avoids much of the reduction of S/N otherwise caused by enhancing detail. However, it still may be desirable to core the R', G' and B' signals to reduce their high-spatial-frequency noise content under conditions where there is not appreciable detail enhancement, when these signals are generated from R, G and B signals originating from a video camera receiving little light, for example.

There are also problems with the FIG. 1 detail enhancement circuit having to do with enhancement of the horizontal and vertical detail components in each of the red (R), green (G) and blue (B) channels depending solely on the image signal of the green (G) channel. The detail enhancement suitable for the characteristics of the respective channels is not achieved. By way of example, detailed red and blue color patterns cannot be enhanced, since there are no green details with which to provide enhancement.

Lee found that enhancement of the red (R) channel details can be carried out satisfactorily in response to the details originally appearing in the red (R) channel, without unacceptably lowering high-frequency signal-to-noise ratio in the red (R) channel, if noise coring of the red (R) channel details is done properly. Lee also found that enhancement of the blue (B) channel details can be carried out in response to the details originally appearing in the blue (B) channel, without unacceptably lowering high-frequency S/N in the blue (B) channel, if noise coring of the blue (B) channel details is done properly. Noise coring of the green (G) channel details also improves high-frequency S/N in that channel. Accordingly, it is possible to enhance the red (R) channel details in response to the details originally appearing in the red (R) channel and to enhance of the blue (B) channel details in response to the details originally appearing in the blue (B) channel, as well as to enhance the green (G) channel details in response to the details originally appearing in the green (G) channel, which procedure avoids problems with the prior art detail enhancement circuit caused by details that are not related primarily to luminance variation.

The red (R) channel high frequencies, separated for use in enhancing detail, can also be used for suppressing high-frequency noise in the red (R) channel when there is very little or no red detail. The green (G) channel high frequencies, separated for use in enhancing detail, can also be used for suppressing high-frequency noise in the green (G) channel when there is very little or no green detail. And the blue (B) channel high frequencies, separated for use in enhancing detail, can also be used for suppressing high-frequency noise in the blue (B) channel when there is very little or no blue detail. This noise-suppression scheme for the fullband R, G and B color signals is useful even when they are subsequently matrixed into a composite video signal using mixed highs.

Lee describes the enhancement of the detail in each color channel being done in reliance on separated high-spatial-frequency information originally contained in that channel, as long as it is sufficiently above thermal noise level. When the detail information originally contained in a channel is insufficiently above thermal noise level, the thermal noise is suppressed by subtracting the separated high-spatial-frequency information therefrom. The same filter arrangements are used to separate high-spatial-frequency information for suppressing thermal noise in each color channel as for enhancing the detail in each color channel.

The respective filter arrangement used to separate high-spatial-frequency information in each color channel is one in which an image signal input is delayed by cascaded first and second delay lines, each providing a delay equal to the duration (1H) of a horizontal scan line. Thereafter, the original (undelayed) image signal, a first output image signal delayed by 1H period by the first 1H delay line, and a second output image signal delayed 2H periods by means of the first and second 1H delay lines are applied to a weight-and-sum circuit that completes a vertical high-pass filter (V HPF) for extracting a vertical detail component. Meanwhile, the 1H-delayed image signal delayed by the first 1H delay line is also applied to a horizontal high-pass filter (H HPF), thereby extracting a horizontal detail component.

The vertical detail component output from the V HPF is filtered by a horizontal low-pass filter (H LPF) to prevent diagonal detail from being excessively enhanced. Then, the detail components respectively extracted by the H HPF and by the H LPF are summed in an adder. The sum output of this adder is subtracted in a subtractor from the first output image signal, delayed by the first 1H delay line, and the sum output is also applied as addressing to a read-only memory (ROM) storing a look-up table (LUT). The output of the ROM contains cored detail components that are linearly combined with the difference output of the subtractor to provide a third output image signal. Detail components and thermal noise are suppressed in this third output image signal when the detail components do not exceed the thermal noise; and detail components are enhanced in this third output image signal when the detail components do exceed the thermal noise.

SUMMARY OF THE INVENTION

The invention is embodied in modifications of the detail enhancement circuits described above in which the filter arrangement to separate high-spatial-frequency information uses fewer elements than that used by Lee and the prior art he describes. In this filter arrangement an image signal input is delayed by cascaded first and second delay lines, each providing a delay equal to the duration (1H) of a horizontal scan line. Thereafter, the original (undelayed) image signal, a first output image signal delayed by 1H period by the first 1H delay line, and a second output image signal delayed 2H periods by means of the first and second 1H delay lines are applied to a weight-and-sum circuit that completes a vertical low-pass filter (V LPF). The vertical low-pass filter response is supplied as input signal to a horizontal low-pass filter (H LPF), the response of which is differentially combined with the output image signal delayed by 1H period by the first 1H delay line for generating addressing for the read-only memory (ROM) storing a look-up table (LUT).

BRIEF DESCRIPTION OF THE DRAWINGS

FIG. 7B is a graph showing the input/output characteristics of a look-up table LUT2 stored in a read-only memory 61 in the FIG. 6 detail enhancement circuit.

DETAILED DESCRIPTION OF THE INVENTION

Figure 1:
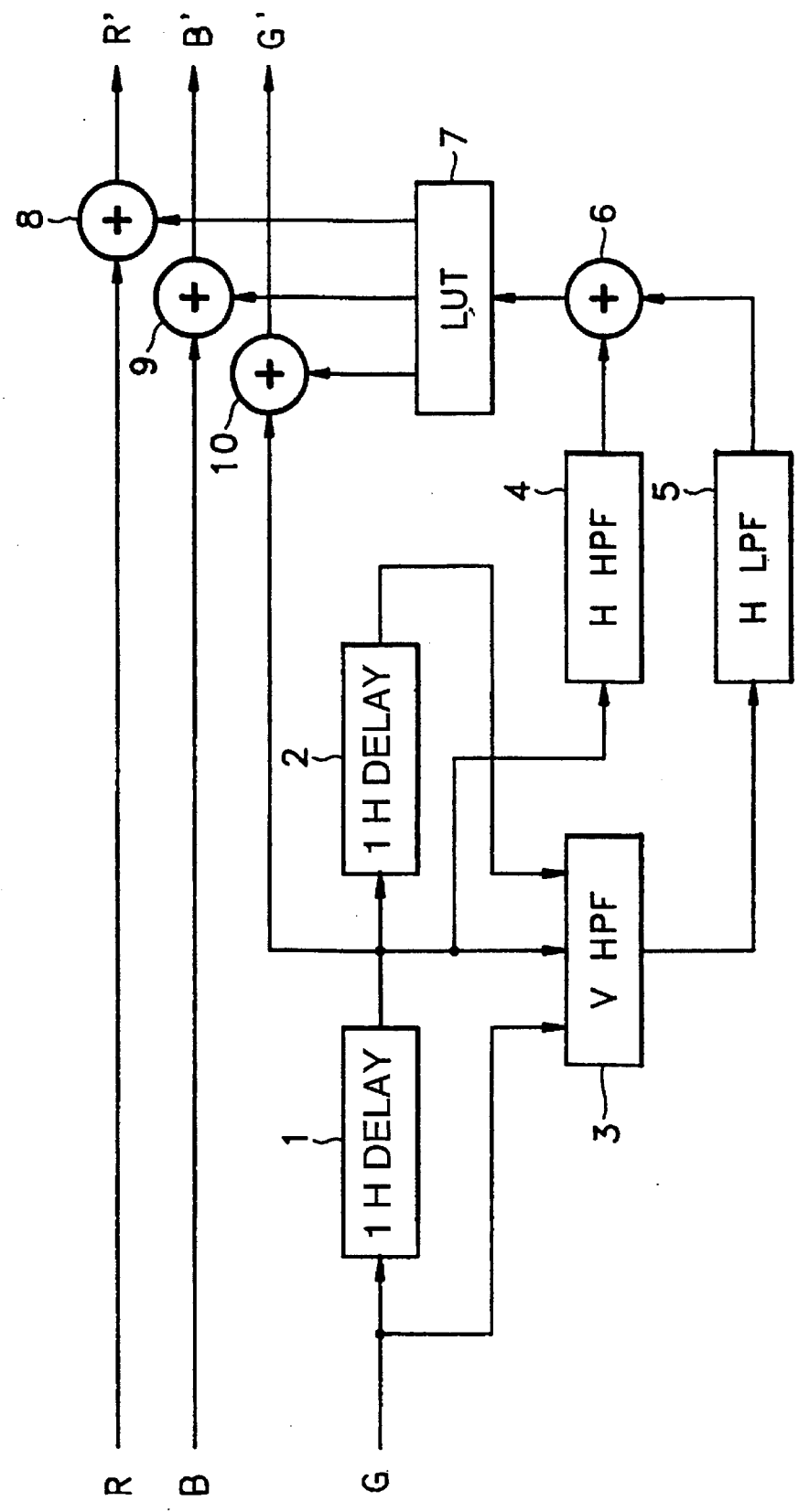
FIG. 1 is a block diagram of a prior-art detail enhancement circuit.
Figure 2A:
FIGS. 2A–2C show examples of the detection of vertical, horizontal and diagonal details, respectively, obtained according to the circuit of FIG. 1.
Figure 2A:
Figure 2A:
Figure 2B:
Figure 2B:
Figure 2B:
Figure 2C:
Figure 2C:
Figure 2C:
Figure 3:
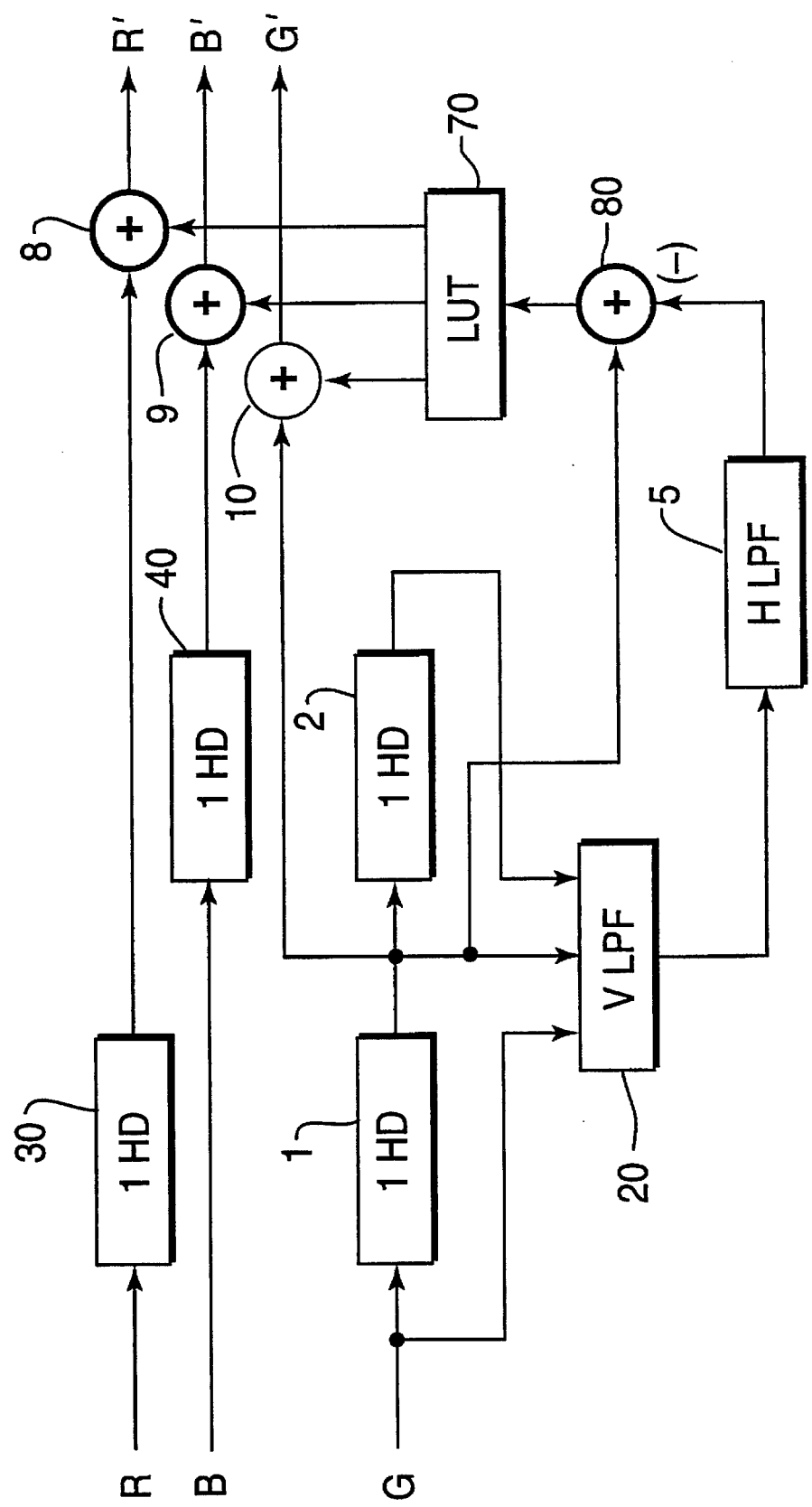
FIG. 3 is a block diagram of a modified FIG. 1 detail enhancement circuit that embodies the invention.

FIG. 3 shows a modified FIG. 1 detail enhancement circuit in which a third 1H delay line 30 supplies a 1H-delayed R signal to the adder 8 to be added to the read-only memory (ROM) 7 output signal and a fourth 1H delay line 40 supplies a 1H-delayed B signal to the adder 9 to be added to the ROM 7 output signal. FIG. 3 shows further modifications made in accordance with the invention wherein: the weight-and-sum network 3 for implementing a vertical highpass filter is replaced by a weight-and-sum network 20 for implementing a vertical lowpass filter; the horizontal highpass filter 4 and the digital adder 6 are dispensed with; and a digital subtractor 80 differentially combines the responses of the 1H delay line 1 and the horizontal lowpass filter 5 to generate addressing for a read-only memory (ROM) 70 that replaces the read-only memory (ROM) 7. The elements 1, 2, 20, 5 and 80 together provide a filter for extracting horizontal and vertical detail from a video signal without exaggerating diagonal detail.

In actual practice the horizontal lowpass filter 5 exhibits latency or delay as between its input and output connections, delaying the subtrahend input to the subtractor 80 more than the one scan line (1H) duration of the 1H delay line 1 response. The delay afforded by the third 1H delay line 30 and the delay afforded by the fourth 1H delay line 40 are each lengthened by respective shim delay equal to the delay through the filter 5. The minuend input to the subtractor 80 is also provided with shim delay equal to the delay through the filter 5.

The detail enhancement circuitry described by Hyo-seung Lee in his concurrently filed U.S. patent application will now be described, before describing modified forms of that detail enhancement circuitry embodying the invention herein disclosed and claimed.

Figure 4:
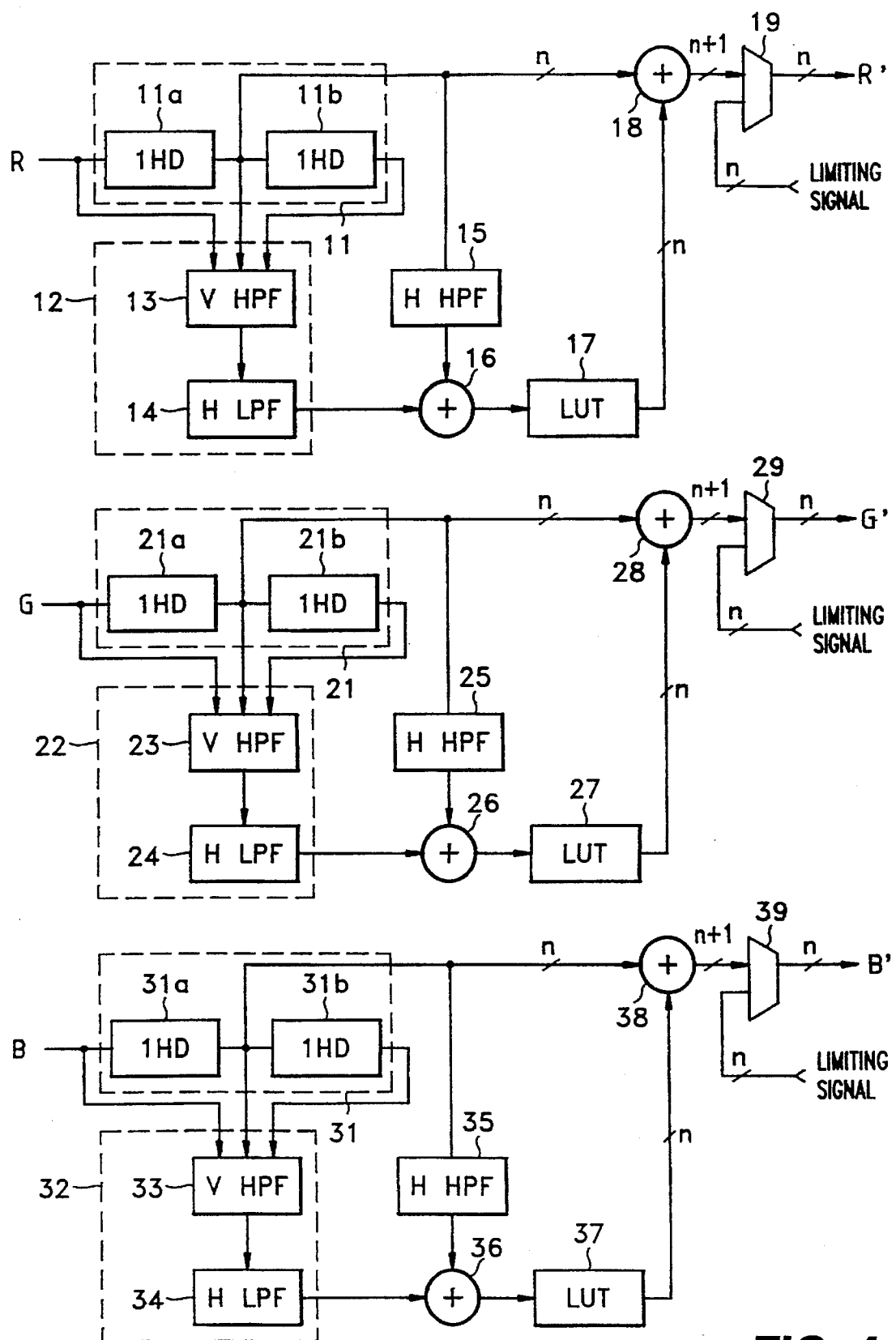
FIG. 4 is a block diagram of a detail enhancement circuit as described by Hyo-seung Lee in his concurrently filed U.S. patent application.

The detail enhancement circuit shown in FIG. 4 includes delay means 11, 21 and 31; vertical detail component extracting means 12, 22 and 32; horizontal detail component extracting means 15, 25 and 35; horizontal/vertical detail component summing means 16, 26 and 36; read-only memories 17, 27 and 37 each storing noise-coring and detail-enhancement amount determining look-up tables (LUTs); detail-enhanced signal supplying means 18, 28 and 38; and digital limiters 19, 29 and 39. The elements with identification numerals in the teens are used for enhancing details in the red (R) channel; the elements with identification numerals in the twenties are used for enhancing details in the green (G) channel; and the elements with identification numerals in the thirties are used for enhancing details in the blue (B) channel. The delay means 11 in the red channel comprises a first 1H delay line 11a and a second 1H delay line 11b; the delay means 21 in the green channel comprises a first 1H delay line 21a and a second 1H delay line 21b; and the delay means 31 in the blue channel comprises a first 1H delay line 31a and a second 1H delay line 31b. The vertical detail component extracting means 12 in the red channel comprises a vertical highpass filter 13 and a horizontal lowpass filter 14, the vertical detail component extracting means 22 in the green channel comprises a vertical highpass filter 23 and a horizontal lowpass filter 24, and the vertical detail component extracting means 32 in the blue channel comprises a vertical highpass filter 33 and a horizontal lowpass filter 34. While the responses of the 1H delay lines 11a, 21a and 31a are shown as being applied directly without further delay to the adders 18, 28 and 38, they are in actuality further delayed to compensate for delays in the filters 14, 15, 24, 25, 34 and 35.

The red, green and blue image signals respectively supplied to the delay means 11, 21 and 31 are gamma-corrected signals. In the delay means 11, 21 and 31, the first 1H delay lines 11a, 21a and 31a respectively delay the red, green and blue image signals each by a 1H period. The second 1H delay lines 11b, 21b and 31b respectively delay the 1H-delayed image signals output from the first 1H delay lines 11a, 21a and 31a each by another 1H period. In the vertical detail component extracting means 12, 22 and 32, the first filters 13, 23 and 33 perform a vertical highpass filtering operation with respect to the original signal, the 1H-delayed signal and the 2H-delayed signal for the red, green and blue channels respectively supplied from the delay means 11, 21 and 31, thereby extracting the vertical detail components present in a predetermined high-frequency band. Then, in order to prevent a double enhancement of diagonal detail components, the second filters 14, 24 and 34 perform a horizontal lowpass filtering operation with respect to the vertical detail components output from the first filters 13, 23 and 33, for the red, green and blue channels, respectively, and thereby cancel the diagonal detail components contained therein. The horizontal detail component extracting means 15, 25 and 35 perform a horizontal highpass filtering operation with respect to the 1H-delayed signal output from the delay means 11, 21 and 31 for the red, green and blue channels, respectively, thereby extracting the horizontal detail components present in a predetermined high-frequency band. The horizontal/vertical detail component summing means 16, 26 and 36 sum the vertical detail components output from the vertical detail component extracting means 12, 22 and 32 with the horizontal detail components output from the horizontal detail component extracting means 15, 25 and 35, for the respective red, green and blue channels. The summed outputs are applied to the read-only memories 17, 27 and 37 each storing combined noise-coring and detail-enhancement look-up tables. The table entries are supplied from the ROMs 17, 27 and 37 in the form of two's complement numbers.

In the FIG. 4 detail enhancement circuit the red (R) channel details are enhanced in response to the details originally appearing in the red (R) channel; the blue (B) channel details are enhanced in response to the details originally appearing in the blue (B) channel; and the green (G) channel details are enhanced in response to the details originally appearing in the green (G) channel. This procedure not only avoids problems with the prior art detail enhancement circuit that are caused by details not related primarily to luminance variation, but permits another operating advantage to be achieved.

In the detail enhancement circuits of FIGS. 1 and 3, when the high spatial-frequency content of any of the R, G and B signals is at low level, background thermal noise in that signal will appear in the corresponding R', G' or B' signal supplied from one of the adders 8, 9 and 10 despite the output from the ROM 7 being zero-valued under these conditions. In accordance with an aspect of the Lee invention, in the FIG. 4 detail enhancement circuit the input-versus-output characteristics of the LUTs stored in the ROMs 17, 27 and 37 are such that thermal noise is reduced in the R', G' and B' signals when the high spatial-frequency components of the R, G and B signals are at low level.

Figure 5:
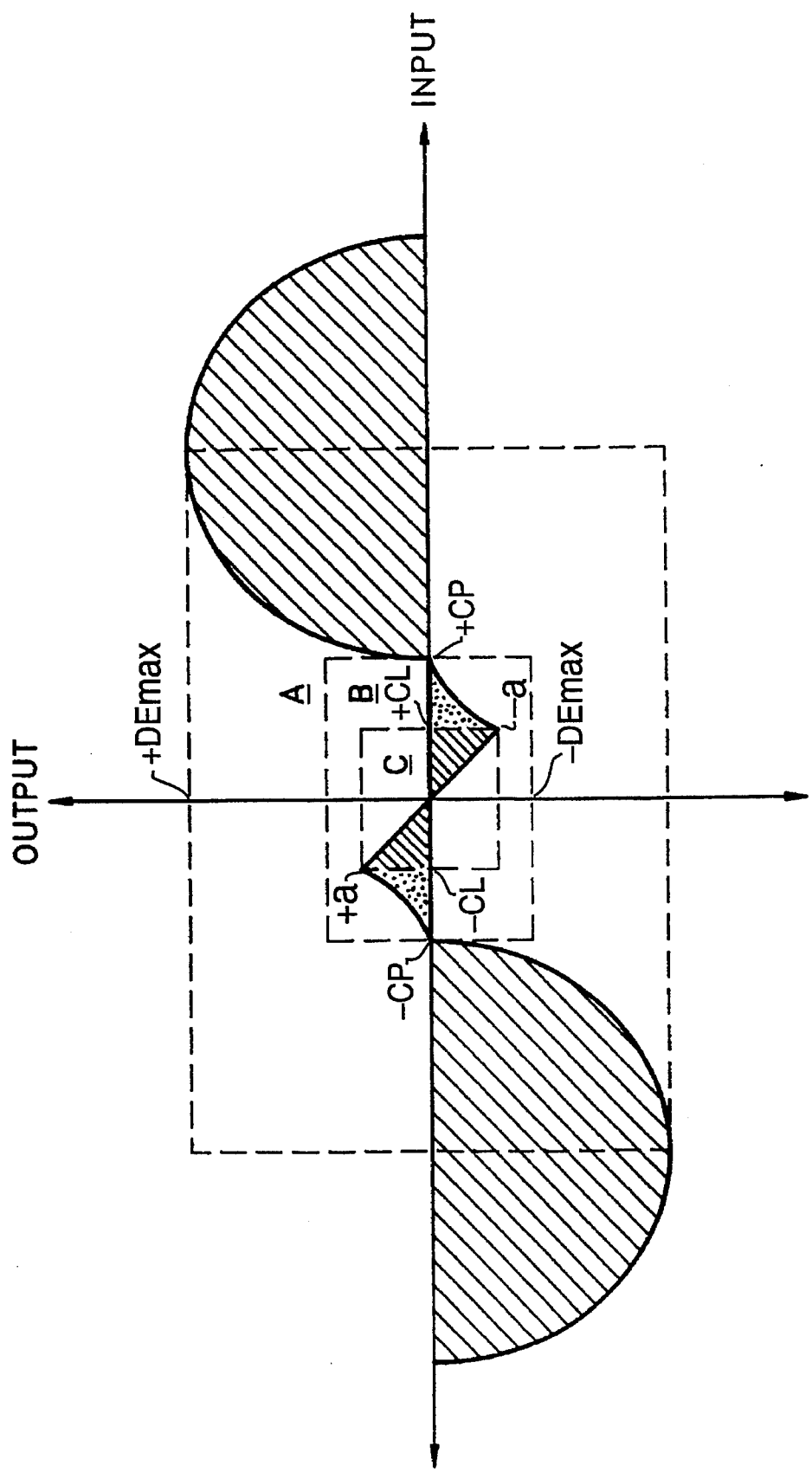
FIG. 5 is a graph showing the input versus output characteristics of a look-up table stored in a read-only memory 58 in the FIG. 4 detail enhancement circuit.

FIG. 5 graphs the input versus output characteristics of the LUTs stored in the ROMs 17, 27 and 37 in FIG. 4. The input signals (the abscissa) are divided into a section A, a section B and a section C, and a critical point (CP) represents a boundary value between the sections A and B, that is, a reference value for noise identification. If the signal level applied to one of the ROMs 17, 27 and 37 storing the noise-canceling and detail enhancement LUTs is greater than +CP or less than −CP (i.e., is within the A region), the LUT stored within the ROM determines the corresponding amount of detail enhancement, ranging from zero to the respective maximum detail enhancement amounts (+DE$_{max}$ and −DE$_{max}$) with respect to the magnitude of the input horizontal and vertical detail components, as shown in FIG. 5, and output the determined detail enhancement amount. On the other hand, if the signal level applied to one of the ROMs 17, 27 and 37 is less than +CP or greater than −CP (i.e., is within the B or C region), the LUT stored within the ROM functions for canceling the high-spatial-frequency noise.

When operating entirely within the operating region C of each of the ROMs 17, 27 and 37 its input addressing, which is within the range from −CL to +CL is primarily high-frequency noise; and its read-out inverts that high-frequency noise. When the input address to the ROM 17 is primarily high-frequency noise from the R signal, which is applied as one summand to the adder 18, the inverted high-frequency noise from the ROM 17, which is applied as another summand to the adder 18, cancels the high-frequency noise from the R' signal supplied from the adder 18. When the input address to the ROM 27 is primarily high-frequency noise from the G signal, which is applied as one summand to the adder 28, the inverted high-frequency noise from the ROM 27, which is applied as another summand to the adder 28, cancels the high-frequency noise from the G' signal supplied from the adder 28. When the input address to the ROM 37 is primarily high-frequency noise from the B signal, which is applied as one summand to the adder 38, the inverted high-frequency noise from the ROM 37, which is applied as another summand to the adder 38, cancels the high-frequency noise from the B' signal supplied from the adder 38.

That is to say, if input signal level to one of the ROMs 17, 27 and 37 is between −CL and +CL (i.e., is in the C region), the corresponding output signal level read from the ROM is the same amplitude as the input signal, but is of opposite polarity, as shown in FIG. 5. If input signal level to one of the ROMs 17, 27 and 37 is between −CP and −CL, or between +CL and +CP (i.e., is in the B region), the output signal level read from the ROM is expressed as a function the absolute value of which exponentially decreases from a value a to zero responsive to increase in the absolute value of input signal level. The output signal level decreases from +a to zero as the input signal level decreases from −CL to −CP, and the output signal level increases from −a to zero as the input signal level increases from +CL to +CP, as shown in FIG. 5.

When the high-frequency component of the signal R supplied from the adder 16 is within the range from −CP to +CP, but has excursions below −CL and above +CL so the ROM 17 addressing is substantially entirely within the operating regions B and C, the cancellation of the high-frequency component of the signal R in the R' signal supplied from the adder 18 is reduced, but there is no enhancement of red detail. When the high-frequency component off the signal G supplied from the adder 26 is within the range from −CP to +CP, but has excursions below −CL and above +CL so the ROM 27 addressing is substantially entirely within the operating regions B and C, the cancellation of the high-frequency component of the signal G in the G' signal supplied from the adder 28 is reduced, but there is no enhancement of green detail. When the high-frequency component or the signal B supplied from the adder 36 is within the range from −CP to +CP, but has excursions below −CL and above +CL so the ROM 37 addressing is substantially entirely within the operating regions B and C, the cancellation of the high-frequency component of the signal B in the B' signal supplied from the adder 38 is reduced, but there is no enhancement of blue detail.

When the high-frequency component of the signal R supplied from the adder 16 has substantial excursions below −CP and above +CP, so the ROM 17 addressing extends beyond the operating regions B and C and substantially into the operating region A, the high-frequency component of the signal R in the R' signal supplied from the adder 18 is augmented by the read-output of the ROM 17, enhancing red detail. When the high-frequency component of the signal R supplied from the adder 16 has excursions that extend ROM 17 addressing outside the operating region A, red detail enhancement is maximized and is reduced for still larger values of the high-frequency component of the signal R.

When the high-frequency component of the signal G supplied from the adder 26 has substantial excursions below −CP and above +CP, so the ROM 27 addressing extends beyond the operating regions B and C and substantially into the operating region A, the high-frequency component of the signal G in the G' signal supplied from the adder 28 is augmented by the read-output of the ROM 27, enhancing green detail. When the high-frequency component of the signal G supplied from the adder 26 has excursions that extend ROM 27 addressing outside the operating region A, green detail enhancement is maximized and is reduced for still larger values of the high-frequency component of the signal G.

When the high-frequency component of the signal B supplied from the adder 36 has substantial excursions below −CP and above +CP, so the ROM 37 addressing extends beyond the operating regions B and C and substantially into the operating region A, the high-frequency component of the signal B in the B' signal supplied from the adder 38 is augmented by the read-output of the ROM 37, enhancing blue detail. When the high-frequency component of the signal B supplied from the adder 36 has excursions that extend ROM 37 addressing outside the operating region A, blue detail enhancement is maximized and is reduced for still larger values of the signal B.

Per custom, the ROMs 17, 27 and 37 are addressed in and read from in two's complement arithmetic. Since the LUT stored in each of these ROMs is symmetrical about zero address, procedures in which the ROM is halved in size and is addressed by absolute values of input signal can be employed. The sign bit is saved and used to direct selective multiplying of the read-out by minus one in two's complement arithmetic when the original memory address was negative.

The following Table 1 shows an example of data output values read from the ROMs 17, 27 and 37 in FIG. 4 for various input values used in their addressing.

TABLE 1

| input value, i | absolute value | output value |
|---|---|---|
| +10 | CP < i | +2 |
| +9 | CP < i | +1 |
| +8 | CP < i | +1 |
| +7 | CL < i < CP | 0 |
| +6 | CL < i < CP | −1 |
| +5 | CL < i < CP | −2 |
| +4 | CL < i < CP | −3 |
| +3 | i < CL | −3 |
| +2 | i < CL | −2 |
| +1 | i < CL | −1 |
| 0 | i < CL | 0 |
| −1 | i < CL | +1 |
| −2 | i < CL | +2 |
| −3 | i < CL | +3 |
| −4 | CL < i < CP | +3 |
| −5 | CL < i < CP | +2 |
| −6 | CL < i < CP | +1 |
| −7 | CL < i < CP | 0 |
| −8 | CP < i | −1 |
| −9 | CP < i | −1 |
| −10 | CP < i | −2 |

The example of the input and output values shown in Table 1 may take several forms depending on the number of signal processing bits, the input levels, and the intended degree of noise cancellation and detail enhancement.

Referring back to FIG. 4, the detail-enhanced signal supplying means 18, 28 and 38 sum the detail enhancement amount of the horizontal and vertical detail components determined from the LUTs stored in the ROMs 17, 27 and 37, with the 1H-delayed signals from the delay means 11, 21 and 31, for the red, green and blue channels, respectively. Then, the detail-enhanced signals R', G' and B' are supplied for the respective red, green and blue channels.

The digital limiters, or symmetrical clippers, 19, 29 and 39 each limit a (n+1)-bit signal to an n-bit signal for further adjusting the magnitude of the output. Considering an 8-bit system, there are two magnitude adjustments involved: namely, setting 128 and all numbers greater than 128 (or a preset level) to 127 (or a preset value), and setting −129 and all numbers less than −129 (or a preset level) to −128 (or a preset value).

The explanation of the detail-enhanced signal supplying means 18, 28 and 38 and the digital limiters 19, 29 and 39 will now be described in regard to six different operational examples with respect to red channel image signal in an n-bit (8-bit) system, wherein an input signal value (i) varies with respect to the CL and CP values and both positive and negative conditions of the LUT output of the ROM 17 are considered.

(1) If CL <i and the output of ROM 17 is negative, then,

LUT:−1;11111111

1HD:+1;0000 0001

Here, the 1HD output of first 1H delay line 11a may not be exactly the same as the LUT output of ROM 17, because high frequency components are extracted to be subsequently applied as input addressing to the ROM 17 and the DC components thereof are deleted. The operation of the detail-enhanced signal supplying means 18 is performed with respect to the DC components and the high-frequency components of the 1HD output of he first 1H delay line 11a and the LUT output from the ROM 17. This example illustrates the case when DC components are zero.

Step 1: Since the most significant bit is a sign bit, the 9th bit is extended by the 8th bit.

LUT;1 1111 1111

1HD;0 0000 0001

Step 2: The outputs of ROM 17 and first 1H delay line 11a are summed, and the result thereof is supplied as "0 0000 0000." Thus, the high frequency value "1" of first 1H delay line 11a is classified as noise to be canceled.

Step 3: This step is to limit at eight bits and the result thereof is supplied as "0000 0000."

(2) If CL<i and the output of ROM 17 is positive, then

LUT:+1;0000 0001

1HD:−1;1111 1111

Step 1: Since the most significant bit is a sign bit, the 9th bit is extended by the 8th bit.

LUT:0 0000 0001

1HD:1 1111 1111

Step 2: The outputs of the ROM 17 and the first 1H delay line 11a are summed, and the result thereof is supplied as "0 0000 0000." The high frequency value "1" of the first 1H delay line 11a is classified as noise to then be canceled. Step 3: This step is to limit at eight bits and the result thereof is supplied as "0000 0000."

(3) If CL<i <CP and the output value of ROM 17 is negative, then

LUT:−3;1111 1101

1HD:+4;0000 0100

Step 1: Since the most significant bit is a sign bit, the 9th bit is extended by the 8th bit.

LUT:1 1111 1101

1HD:0 0000 0100

Step 2: The outputs of the ROM 17 and the first 1H delay line 11a are summed, and the result thereof is supplied as "0 0000 0001." Thus, the high frequency value "4" of the first 1H delay line 11 a becomes "1."

Step 3: This step is to limit at eight bits and the result thereof is supplied as "0000 0001."

(4) If CL<i<CP and the output value of the ROM 17 is positive, then,

LUT:+3;0000 0011

1HD:−4;1111 1100

Step 1: Since the most significant bit is a sign bit, the 9th bit is extended by the 8th bit.

LUT:0 0000 0011

1HD:1 1111 1100

Step 2: The outputs of the ROM 17 and the first 1H delay line 11a are summed, and the result thereof is supplied as "1 1111 111." Thus, the high frequency value "−4" of the first 1H delay line 11a becomes "−1."

Step 3: This step is to limit at eight bits and the result thereof is supplied as "1111 1111."

(5) If CP<i and the output of ROM 17 is negative, then,

LUT:−1;1111 1111

1HD:−9;1111 0111

Step 1: Since the most significant bit is a sign bit, the 9th bit is an extension from the 8th bit.

LUT:1 1111 1111

1HD:1 1111 0111

Step 2: The outputs of the ROM 17 and the first 1H delay line 11a are summed, and the result thereof is supplied as "1 1111 0110." Thus, the high frequency value "−9" of the first 1H delay line ROM 17 becomes "−10."

Step 3: This step is to limit at eight bits and the result thereof is supplied as "1111 0110."

(6) If CP<i and the output value of the ROM 17 is positive, then,

LUT:+1;0000 0001

1HD:+9;0000 1001

Step 1: Since the most significant bit is a sign bit, the 9th bit is extended by the 8th bit.

LUT:0 0000 0001

1HD:0 0000 1001

Step 2: The outputs of the ROM 17 and the first 1H delay line 11a are summed, and the result thereof is supplied as "0 0000 1010." Thus, the high frequency value "9" of the first 1H delay line 11a becomes "10."

Step 3: This step is to limit at eight bits and the result thereof is supplied as "0000 1010."

In the above examples, before starting the summing operation, the n-bit signal is replaced with an (n+1)-bit signal obtained by sign bit extension, in order to prevent sign changes owing to a carry operation, and the result of the summing operation is subsequently truncated to n bits by eliminating the sign bit extension. In the FIG. 4 detail enhancement circuitry, depending on the magnitude of the horizontal and vertical detail components, the detail components are cored at a predetermined core level or are enhanced in accordance with the LUT entries stored in the ROMs 17, 27 and 37, the LUTs each having input/output characteristics as shown in FIG. 5. When the S/N ratio is measured with the detail enhancement circuit operating, the S/N ratio is improved over that measured with the detail enhancement circuit not operating. The FIG. 6 detail enhancement circuit basically includes delay means 50, vertical detail component extracting means 53, horizontal detail component extracting means 56, horizontal/vertical detail component summing means 57, a ROM 58 storing a noise-coring look-up table (LUT1), detail component canceling means 59, detail component summing means 60, a ROM 61 storing a detail-enhancement look-up table (LUT2), and detail-enhanced signal supplying means 62. The delay means 50 comprises a first delay line 51 for delaying the image signals of the red, green and blue channels each by 1H and a second delay line 52 for further delaying by 1H the 1H-delayed image signals of the red, green and blue channels supplied from the first delay line 51. Further, the first delay 51 is composed of three 1H delay lines 51a, 51b and 51c; and the second delay 52 is composed of three 1H delay lines 52a, 52b and 52c.

The vertical detail component extracting means 53 comprises a first filter 54 for receiving an original signal, a 1H-delayed signal and a 2H-delayed signal for the respective red, green and blue channels, and performing a vertical highpass filtering operation with respect thereto; and a second filter 55 for performing a horizontal lowpass filtering operation with respect to the response from the first filter 54, for the respective red, green and blue channels. Further, the first filter 54 is composed of three vertical highpass filters 54a, 54b and 54c, and the second filter 55 is composed of three horizontal lowpass filters 55a, 55b and 55c. The horizontal detail component extracting means 56 comprises three horizontal highpass filters 56a, 56b and 56c for performing a horizontal highpass filtering operation with respect to the responses from the first delay 51, for the red, green and blue channels, respectively. The horizontal/vertical detail component summing means 57 comprises three adders 57a, 57b and 57c for summing the output signal of the vertical detail component extracting means 53 with that of horizontal detail component extracting means 56, for the red, green and blue channels, respectively. The detail component canceling means 59 comprises three subtractors 59a, 59b and 59c for subtracting the output of the horizontal/vertical detail component summing means 57 from the 1H-delayed image signal output of first delay 51, for the red, green and blue channels, respectively. The detail component summing means 60 comprises three adders 60a, 60b and 60c for summing the LUT1 output signal from the ROM 58 with the image signal supplied from the detail component canceling means 59, for the red, green and blue channels, respectively. The detail-enhanced signal supplying means 62 comprises three adders 62a, 62b and 62c for summing the LUT2 output signal from the ROM 61 with the image signal supplied from the detail component summing means 60 for the red, green and blue channels.

Figure 6:
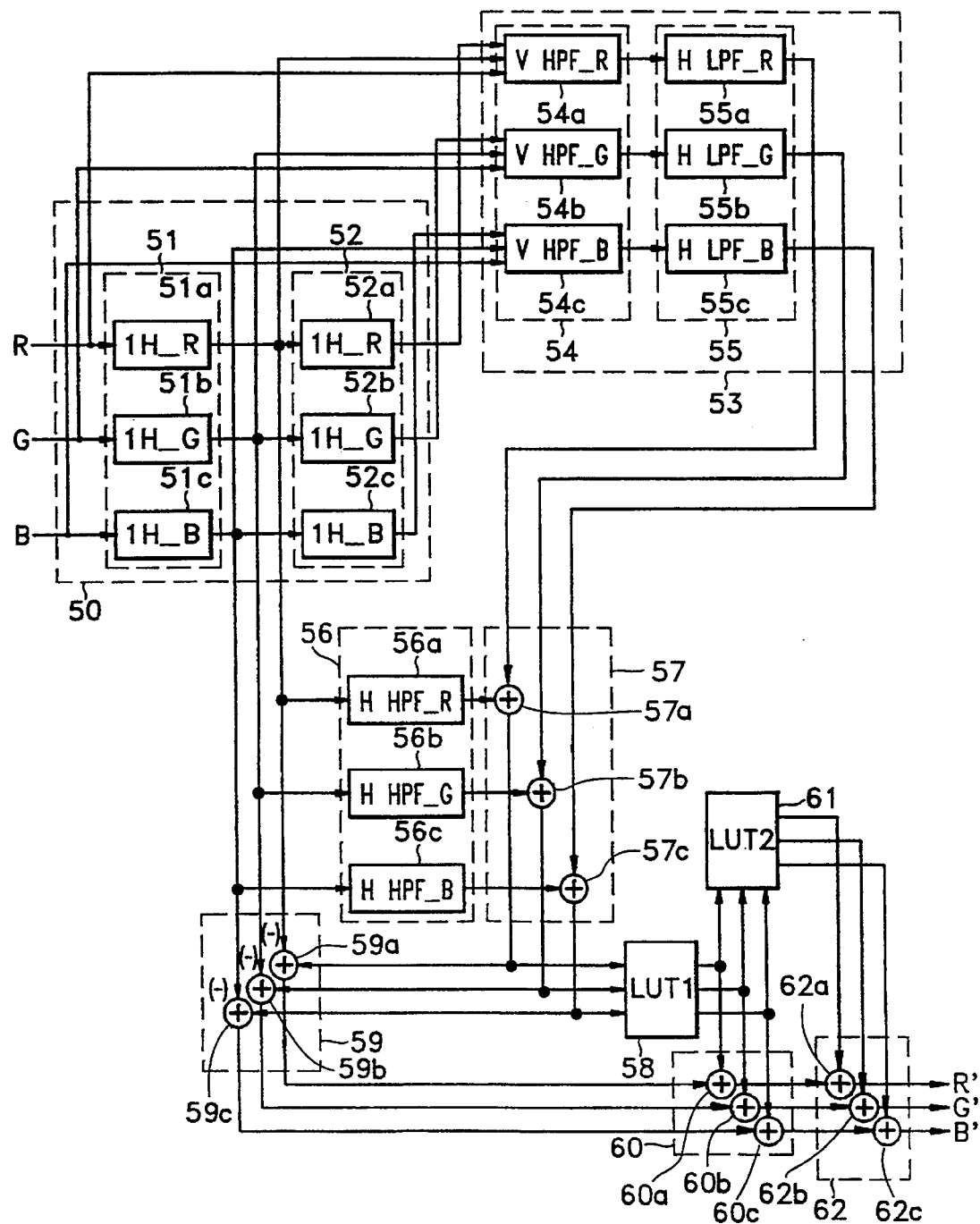
FIG. 6 is a block diagram of another detail enhancement circuit as described by Hyo-seung Lee in his concurrently filed U.S. patent application.

The operation of the delay means 50 in the FIG. 6 circuitry corresponds to the collective operations of the delay means 11, 21 and 31 in the FIG. 4 circuitry. The operation of the vertical detail component extracting means 53 in the FIG. 6 circuitry corresponds to the collective operations of the vertical detail component extracting means 12, 22 and 32 in the FIG. 4 circuitry. The operation of the horizontal detail component extracting means 56 corresponds to the collective operations of the horizontal detail component extracting means 15, 25 and 35 in the FIG. 4 circuitry. And the operation of horizontal/vertical detail component summing means 57 corresponds to the collective operations of the horizontal/vertical detail component summing means 16, 26 and 36 in the FIG. 4 circuitry.

Figure 7A:
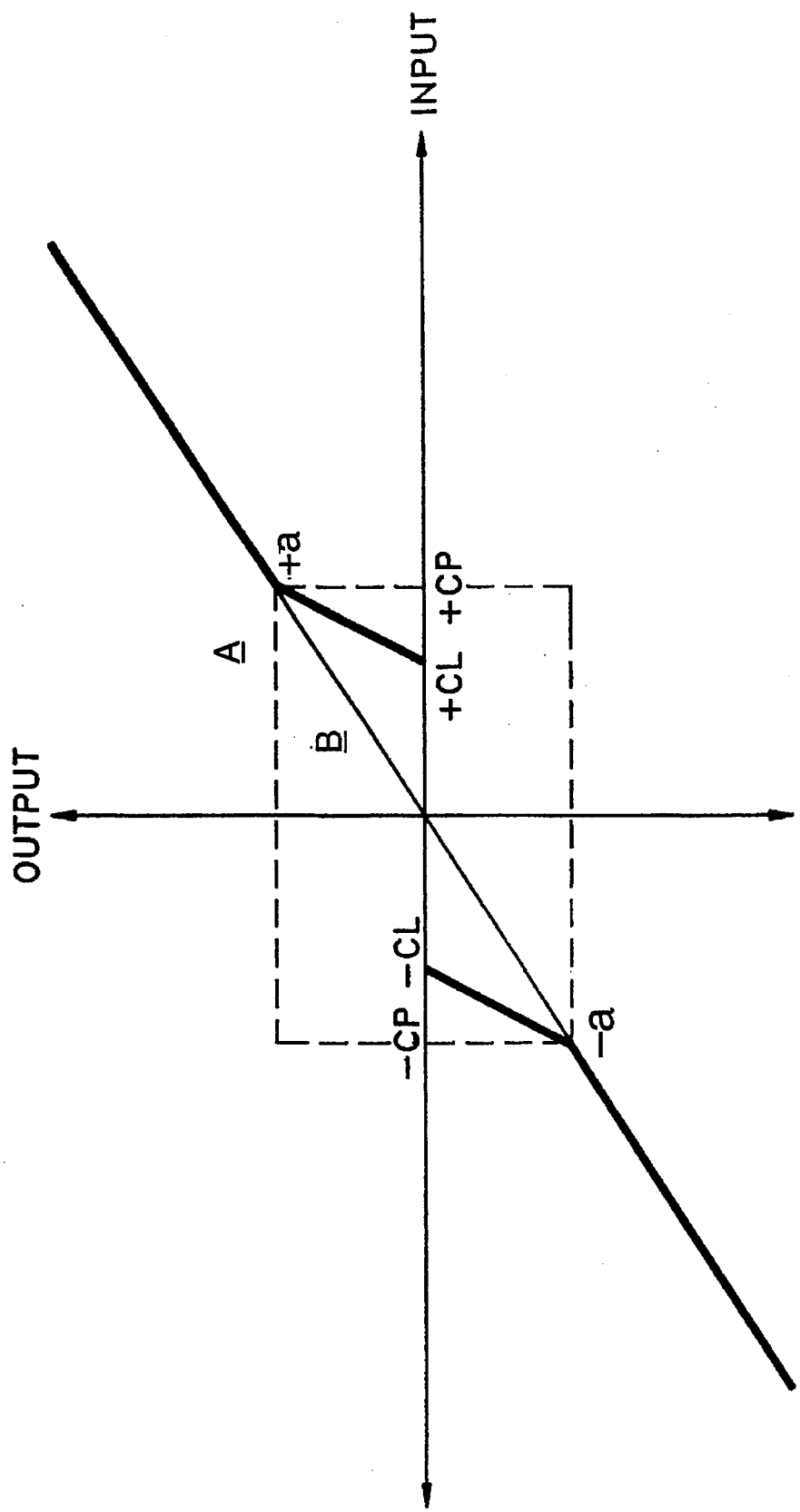
FIG. 7A is graph showing the input/output characteristics of a look-up table LUT1 stored in a read-only memory 58 in the FIG. 6 detail enhancement circuit.

In the FIG. 6 detail enhancement circuitry, if input signals are cored at a predetermined core level by reading from the ROM 58 storing LUT1 having such input and output characteristics as shown in FIG. 7A, the noise included in the input signals can be reduced and the attenuation of the image signal which occurs during the coring process is also prevented. Also, since a smooth change in output signals is derived around the CL value, a blurring phenomenon produced on a screen during display is eliminated.

FIG. 7A shows an input/output characteristic of the noise canceling lookup table (LUT1) stored in the ROM 58, which supplies its read out in two's complement arithmetic. Referring to FIG. 7A, the input signals (the abscissa) are divided into a section A and a section B. and a critical point (CP) represents a boundary value between the sections A and B. that is, a reference value for noise identification.

If the signal values addressing the ROM 58 storing LUT1 are greater than +CP or are less than −CP (in the section A), the output signal (ordinate values) follows the input signal linearly. However, if the signal values addressing the ROM 58 storing the noise-canceling LUT1 are in the section B between −CL and +CL, the output signal is zero; if the signal values signal values addressing the ROM 58 are between −CP and −CL, the output signal decreases as a first-order function of decrease in input signal level, changing from zero at −CL input signal level to −a value at −CP input signal level; and, if the signal values signal values addressing the ROM 58 are between +CL and +CP input signal level, the output signal increases as a first-order function of increase in input signal level, changing from zero at +CL input signal level to +a value at +CP input signal level, as shown in FIG. 7A.

Referring back to FIG. 6, the detail component canceling means 59 subtracts the horizontal and vertical detail components output of horizontal/vertical detail component summing means 57 from the 1H-delayed signals supplied by the first 1H delay line 51 for the respective red, green and blue channels, using subtractors 59a, 59b and 59c, respectively. The result is then supplied to detail component summing means 60 and is also used for addressing the read-only memory 61.

The detail component summing means 60 sums the 1H-delayed image signals including no detail component and supplied from the detail component canceling means 59 with the horizontal/vertical detail components from which noise is canceled read from the ROM 58 storing LUT1. Adders 60a, 60b and 60c provide this summation for the red, green and blue channels, respectively. The summed results are supplied to detail-enhanced signal supplying means 62.

FIG. 7B shows the input/output characteristic of the detail enhancement amount determining look-up table LUT2 stored in the ROM 61, which supplies its read out in two's complement arithmetic. The detail enhancement amount determining look-up table LUT2 determines the corresponding one among the detail enhancement amounts ranging from zero to the respective maximum detail enhancement amounts (+$DE_{max}$ and −$DE_{max}$) with respect to the magnitude of the input horizontal and vertical detail components, per FIG. 7B, and supplies the determined detail enhancement amount. The ROM 61 determines in accordance with LUT2 stored therewithin the detail enhancement amount with respect to the input horizontal and vertical detail components supplied from the ROM 58. The determined detail enhancement amount is read from the ROM 61 to the detail-enhanced signal supplying means 62.

Finally, the detail-enhanced signal supplying means 62 sums the detail enhancement amount of the horizontal and vertical detail components determined from LUT2 as stored in the ROM 61 with the signals supplied from the detail component summing means 60. Adders 62a, 62b and 62e provide this summation for the red, green and blue channels, respectively. The sum output signals from the adders 62a, 62b and 62c provide detail-enhanced signals for the red, green and blue channels R', G' and B', respectively.

Since noise cancellation must be carried out separately in the red, blue and green channels, in practice the ROM 58 advantageously comprises three separate ROMs each storing LUT1, which separate ROMs are individually addressed by the sum outputs of the adders 57a, 57b and 57c, respectively. The individual ROMs with fewer bits in their read addresses have fewer storage locations than a single ROM with read addresses composed of all the bits in the sum outputs of the adders 57a, 57b and 57c. The simplicity of the LUT1 system characteristic permits the characteristic to be generated in digital hardware rather than having to be stored in ROM as one skilled in the art of digital design will readily appreciate.

The ROM 61 may comprise three separate ROMs each storing LUT2. However, a single ROM can supply similar detail enhancement values, but less affected by noise when its addressing is indicative that the detail is luminance related. In these address regions, the detail enhancement is determined primarily from the lower-noise green-channel portions of the address. Addressing the ROM 61 with the cored read output of the ROM 58, rather than parallelly addressing the ROMs 58 and 61, avoids the need for ROM 61 storing a number of zero values for low ROM 58 input address values. Rather than separately supplying cored detail to the R, G and B channels from ROM 58 via a first set of adders 60 and supplying enhanced cored detail to the R, G and B channels from ROM 61 via a second adders 62, it should be possible to supply the combined detail components from a ROM to the R', G' and B' channels via a single set of adders, Lee points out.

Figure 8:
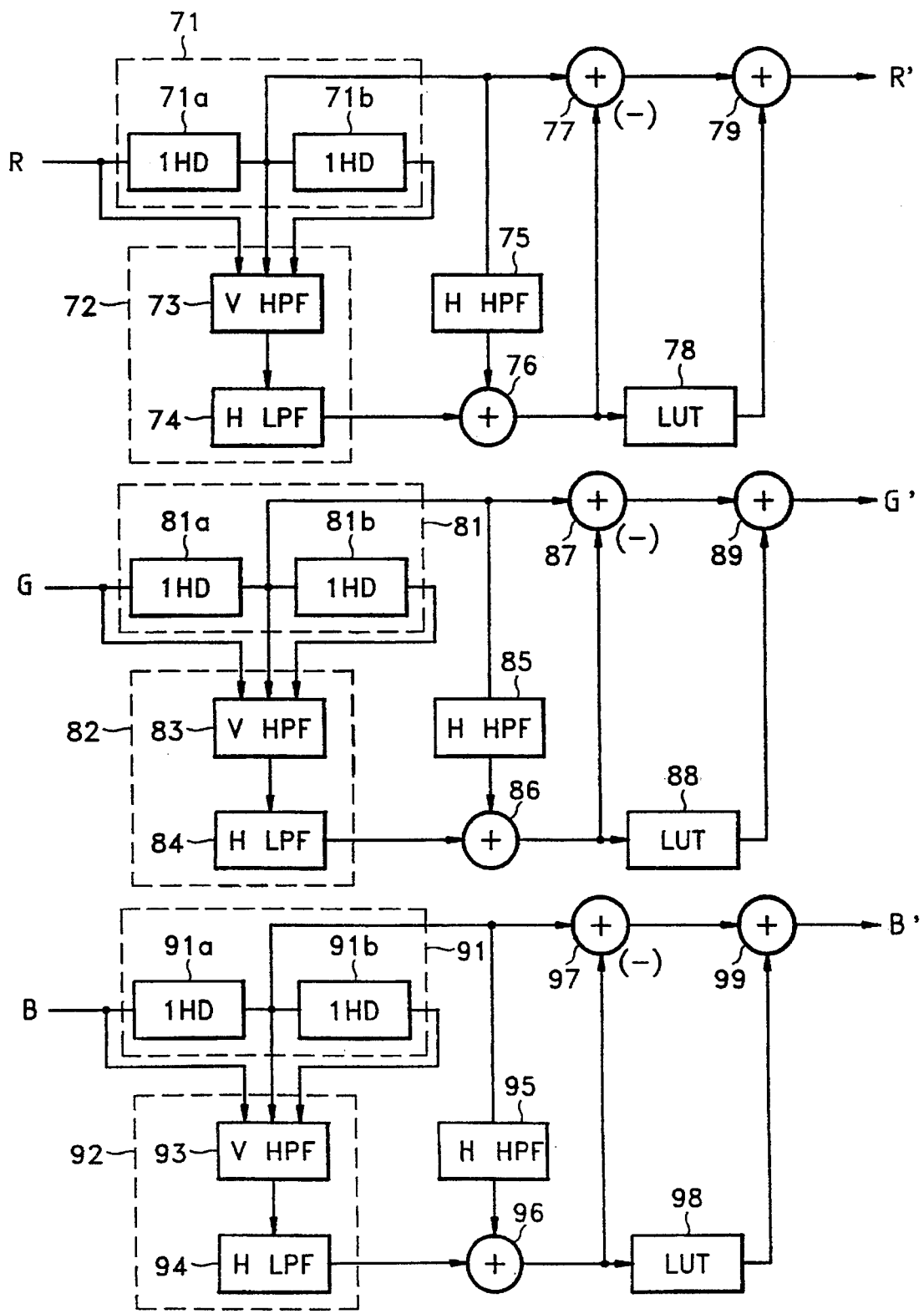
FIG. 8 is a block diagram of still another detail enhancement circuit as described by Hyo-seung Lee in his concurrently filed U.S. patent application.

FIG. 8 is a block diagram of such a detail enhancement circuit. The FIG. 8 detail enhancement circuit includes delay means 71, 81 and 91; vertical detail component extracting means 72, 82 and 92; horizontal detail component extracting means 75, 85 and 95; horizontal/vertical detail component summing means 76, 86 and 96; detail component canceling means 77, 87 and 97; read-only memories (ROMs) 78, 88 and 98 storing look-up tables (LUTs) used for canceling noise and for determining the amount of detail enhancement; and detail-enhanced signal supplying means 79, 89 and 99 tier the red, green and blue channels, respectively. More particularly, the delay means 71 in the red channel comprises a first 1H delay line 71*a* and a second 1H delay line 71*b*; the delay means 81 in the green channel comprises a first 1H delay line 81*a* and a second 1H delay line 81*b*; and the delay means 91 in the blue channel comprises a first 1H delay line 91 a and a second 1H delay line 91*b*. Also, more particularly, the vertical detail component extracting means 72 in the red channel comprises a vertical highpass filter 73 and a horizontal lowpass filter 74; the vertical detail extracting means 82 in the green channel comprises a vertical highpass filter 83 and a horizontal lowpass filter 84; and the vertical detail extracting means 92 in the blue channel comprises a vertical highpass filter 93 and a horizontal lowpass filter 94.

Figure 9:
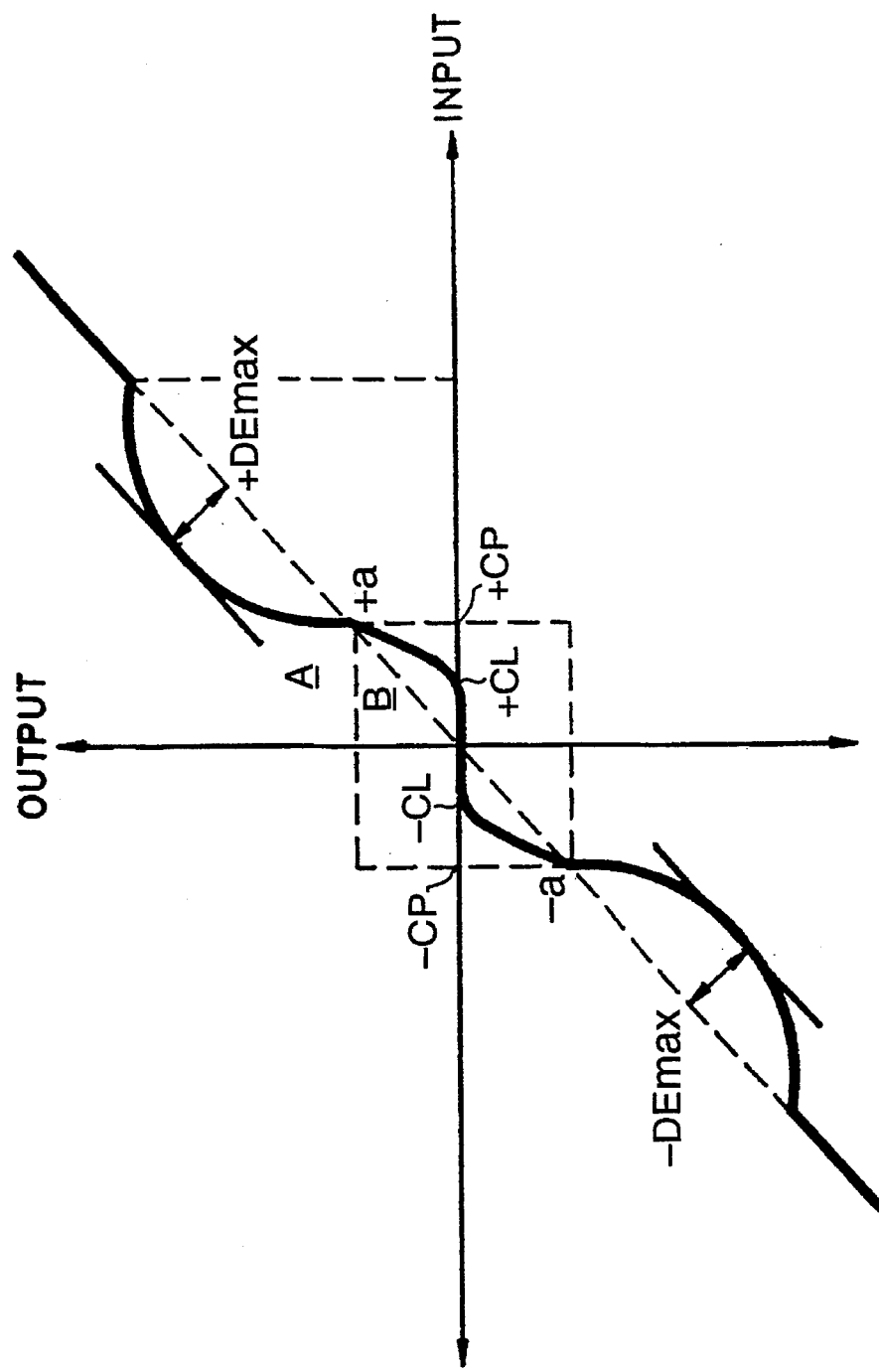
FIG. 9 is graph showing the input/output characteristics of the look-up table stored in read-only memories 78, 88 and 98 in the FIG. 8 detail enhancement circuit.

FIG. 9 is graph showing the input versus output characteristics of the noise canceling and detail enhancement amount determining look-up table (LUTs) stored in the ROMs 78, 88 and 98 of FIG. 8. The operation of the FIG. 8 detail enhancement circuitry will now be described in detail with reference to both FIGS. 8 and 9. The operations of the delay means 71, 81 and 91; the vertical detail component extracting means 72, 82 and 92; the horizontal detail component extracting means 75, 85 and 95; and the horizontal/vertical detail component summing means 76, 86 and 96 respectively correspond to the operations of the delay means 11, 21 and 31; the vertical detail component extracting means 12, 22 and 32; the horizontal detail component extracting means 15, 25 and 35; and the horizontal/vertical detail component summing means 16, 26 and 36 of the FIG. 4 detail enhancement circuit. The collective operations of the delay means 71, 81 and 91 correspond to the operation of the delay means 50 of the FIG. 6 detail enhancement circuit. The collective operations of the vertical detail component extracting means 72, 82 and 92 correspond to the operation of the vertical detail component extracting means 53 of the FIG. 6 detail enhancement circuit. The collective operations of the horizontal detail component extracting means 75, 85 and 95 correspond to the operation of the horizontal detail component extracting means 56 of the FIG. 6 detail enhancement circuit. And the collective operations of the horizontal/vertical detail component summing means 76, 86 and 96 correspond to the operation of the horizontal/vertical detail component summing means 57 of the FIG. 6 detail enhancement circuit. The operations of the detail component canceling means 77, 87 and 97 respectively correspond to the operations of the subtractors 59*a*, 59*b* and 59*c* in the detail component canceling means 59 of the FIG. 6 detail enhancement circuit.

Referring to FIG. 9, the input signals (the abscissa) are divided into a section A and a section B, and a critical point (CP) represents a boundary value between the sections A and B, that is, a reference value for noise identification. If the signal values applied to the ROMs 78, 88 and 98 as addresses are greater than +CP or less than −CP (the A section), the noise canceling and detail enhancement amount determining LUTs stored in the ROMs 78, 88 and 98 function for determining the detail enhancement amount, by determining the corresponding one among the detail enhancement amounts ranging from zero to the respective maximum detail enhancement amounts (+$DE_{max}$ and −$DE_{max}$) with respect to the magnitude of the input horizontal and vertical detail components as shown in FIG. 9, and supplying the determined detail enhancement amount. On the other hand, if the signal values applied to the noise-canceling and detail enhancement amount determining LUTs 78, 88 and 98 are less than +CP or greater than −CP (the B section), the noise-canceling and detail enhancement amount determining LUTs 78, 88 and 98 function for canceling the noise.

That is to say, it an input signal is present between −CL and +CL, the output signal is zero. If an input signal is present between −CP and −CL, or between +CL and +CP, the output signal is expressed in the form of an exponentially decreasing function ranging from the +CL point of the abscissa to the +a point, or from the −CL point of the abscissa to the −a point, as shown in FIG. 9.

That is to say, the horizontal and vertical detail components used to address the ROMs 78, 88 and 98 determine by their respective magnitudes the types of output signal the ROMs 78, 88 and 98 supply. If the magnitude of the input signal is less than CP, noise-canceled horizontal and vertical detail component are supplied. If the magnitude of the input signal is greater than CP, horizontal and vertical detail component whose corresponding detail enhancement amounts are determined are supplied. The table entries stored in the ROMs 78, 88 and 98 are supplied therefrom in the form of two's complement numbers.

In the FIG. 8 detail enhancement circuitry, the horizontal and vertical detail components are cored at predetermined core level, or the detail enhancement amount is determined, according to the magnitude of the horizontal and vertical detail components, by using the LUTs 78, 88 and 98 having such input/output characteristics as shown in FIG. 9. Even though the S/N ratio is measured with the detail enhancement circuit operating, the S/N ratio is improved.

Figure 10:
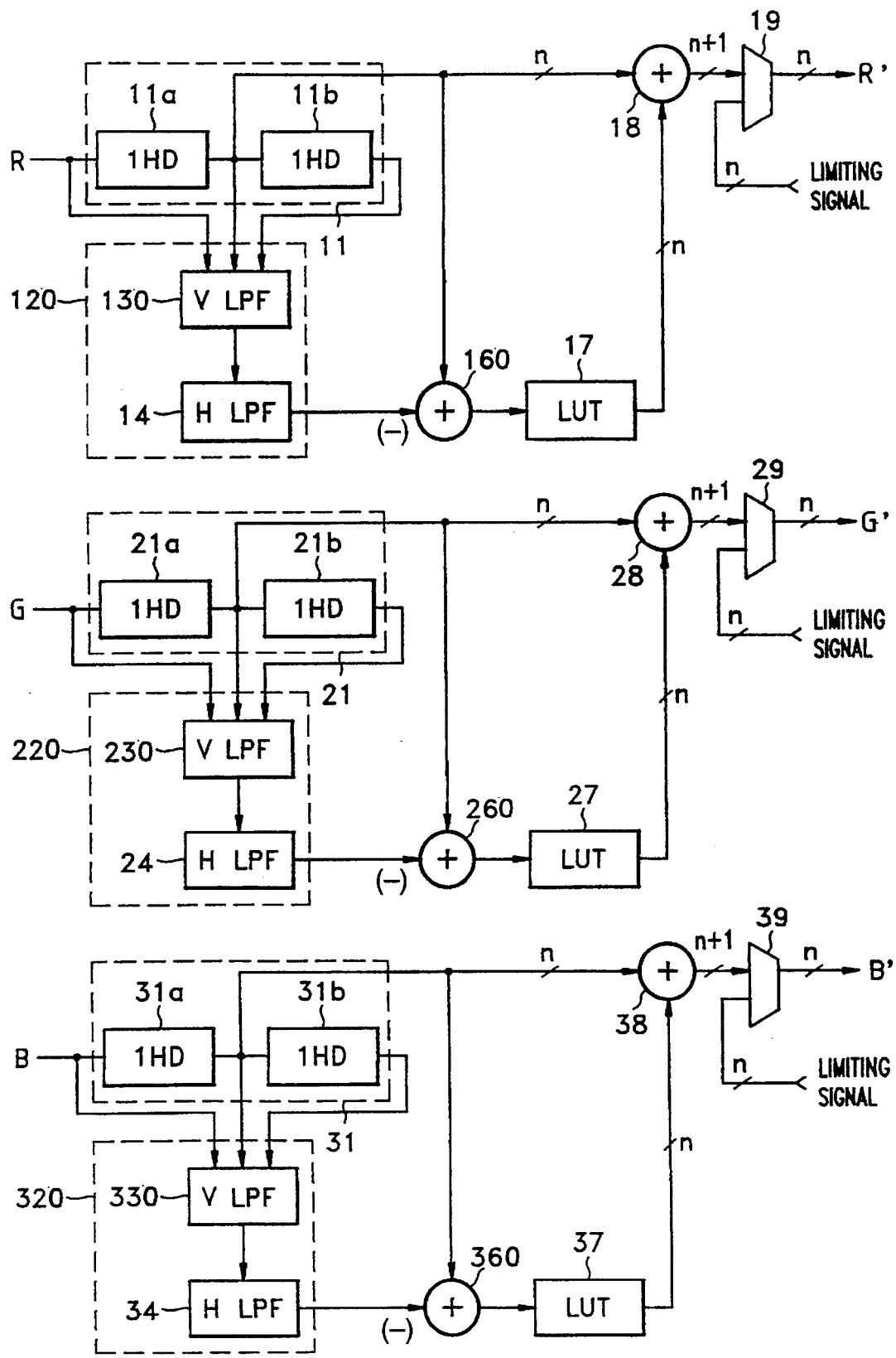
FIG. 10 is a block diagram of a modified FIG. 4 detail enhancement circuit that embodies the invention.

The FIG. 10 detail enhancement circuit is a modification of the FIG. 4 detail enhancement circuit, in which in accordance with the invention the spatial filter for separating detail information is simplified. The detail enhancement circuit shown in FIG. 10 still includes delay means 11, 21 and 31; read-only memories 17, 27 and 37 each storing noise-coring and detail-enhancement amount determining look-up tables (LUTs); detail-enhanced signal supplying means 18, 28 and 38; and digital limiters 19, 29 and 39. The delay means 11 in the red channel comprises a first 1H delay line 11*a* and a second 1H delay line 11*b*; the delay means 21 in the green channel comprises a first 1H delay line 21*a* and a second 1H delay line 21*b*; and the delay means 31 in the blue channel comprises a first 1H delay line 31*a* and a second 1H delay line 31*b*. Vertical detail component extracting means 12, 22 and 32; horizontal detail component extracting means 15, 25 and 35; horizontal/vertical detail component summing means 16, 26 and 36 are dispensed with. Addressing for the ROMs 17, 27 and 37 are the difference output signals supplied by subtractors 160, 260 and 360, respectively, receiving respective subtrahend input signals from two-dimensional spatial lowpass tillers 120, 220 and 320, respectively. While the responses of the 1H delay lines 11*a*, 21*a* and 31*a* are shown as being applied directly without further delay to the subtractors 160, 260 and 360 as respective minuend input signals, they are in actuality further delayed to compensate for delays in the filters 14, 24, and 34. The two-dimensional spatial lowpass filter 120 in the red channel comprises a weight-and-sum circuit 130 supplying a vertical lowpass filter response and a horizontal lowpass filter 140 supplying a two-dimensional spatial lowpass filter response to the vertical lowpass filter response from the circuit 130, the two-dimensional spatial lowpass filter 220 in the green channel comprises a weight-and-sum circuit 230 supplying a vertical lowpass filter response and a horizontal lowpass filter 240 supplying a two-dimensional spatial lowpass filter response to the vertical lowpass filter response from the circuit 230, and the two-dimensional spatial lowpass filter 320 in the blue channel comprises a weight-and-sum circuit 330 supplying a vertical lowpass filter response and a horizontal lowpass filter 340 supplying a two-dimensional dimensional spatial lowpass filter response to the vertical lowpass filter response from the circuit 330.

Figure 11:
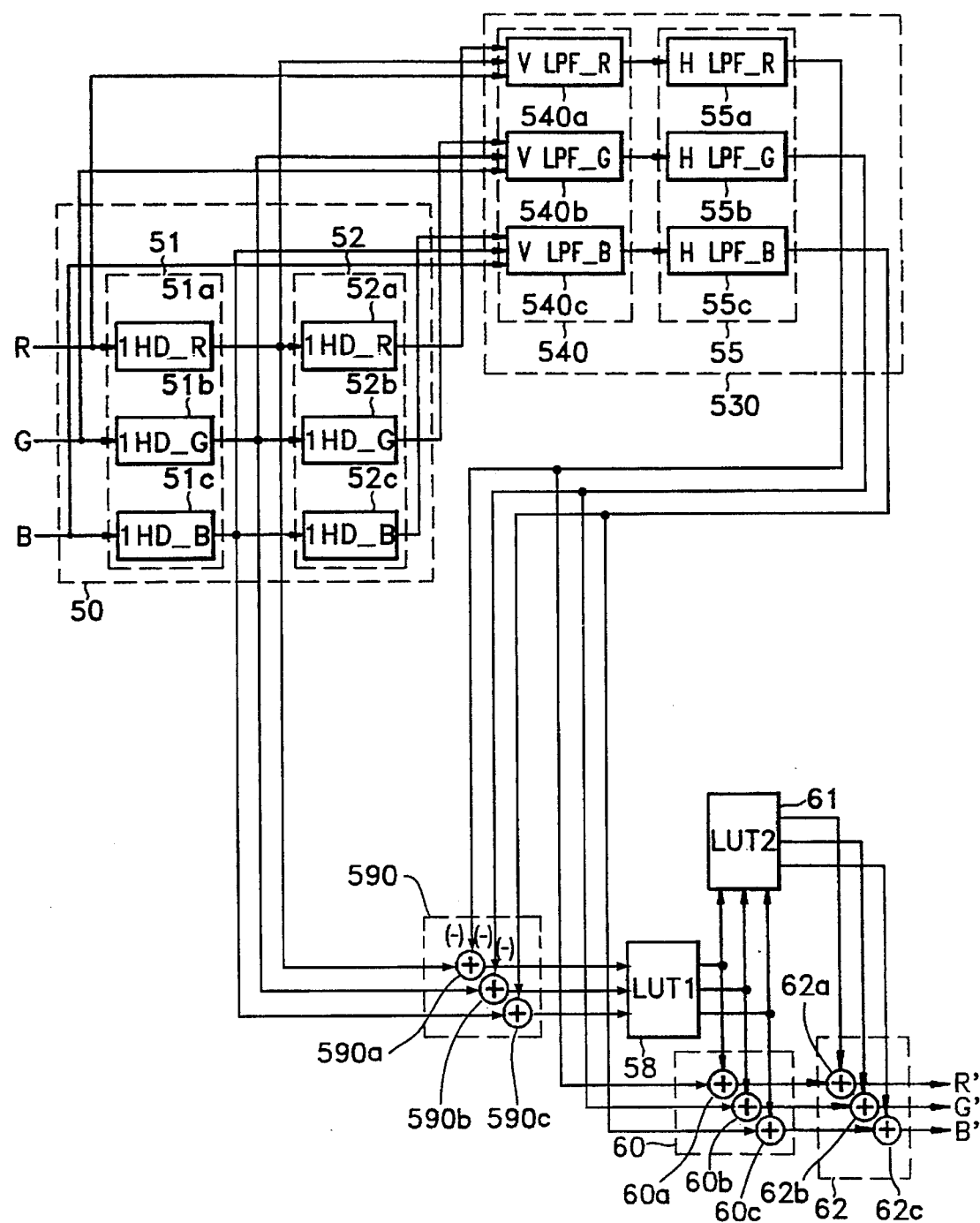
FIG. 11 is a block diagram of a modified FIG. 6 detail enhancement circuit that embodies the invention.

The FIG. 11 detail enhancement circuit is a modification of the FIG. 6 detail enhancement circuit, in which the spatial filter for separating detail information is simplified in accordance with the invention. The detail enhancement circuit shown in FIG. 11 still includes delay means 50, a ROM 58 storing a noise-coring look-up table (LUT1), detail component summing means 60, a ROM 61 storing a detail-enhancement look-up table (LUT2), and detail-enhanced signal supplying means 62. The delay means 50 comprises a first delay line 51 for delaying the image signals of the red, green and blue channels each by 1H and a second delay line 52 for further delaying by 1H the 1H-delayed image signals of the red, green and blue channels supplied from the first delay line 51. Further, the first delay 51 is composed of three 1H delay lines 51a, 51b and 51c; and the second delay 52 is composed of three 1H delay lines 52a, 52b and 52c. The vertical detail component extracting means 53, horizontal detail component extracting means 56, horizontal/vertical detail component summing means 57, and detail component canceling means 59 of the FIG. 6 detail enhancement circuit are dispensed with. A two-dimensional spatial lowpass filter 530 supplies detail-free signals to the detail component summing means 60 and to detail component extracting means 590, which means 590 supplies addressing to the ROM 58 storing the noise-coring look-up table (LUT1).

More particularly, the two-dimensional spatial lowpass filter 530 comprises the cascade connection of a filter 540 for performing a vertical lowpass filtering operation and a filter 550 for performing a horizontal lowpass filtering operation. The filter 540 is composed of three vertical lowpass filters 540a, 540b and 540c for the red, green and blue channels, respectively; and the filter 550 is composed of three horizontal lowpass filters 550a, 550b and 550c for the red, green and blue channels, respectively. The detail component extracting means 590 comprises a subtractor 590a for subtracting the filter 540 response to the signal R from the 1H-delayed signal R supplied by the delay line 51 a to separate red-channel detail, a subtractor 590b for subtracting the filter 540 response to the signal G from the 1H-delayed signal G supplied by the delay line 51b to separate green-channel detail, and a subtractor 590c for subtracting the filter 540 response to the signal B from the 1H-delayed signal B supplied by the delay line 51a to separate blue-channel detail.

Figure 12:
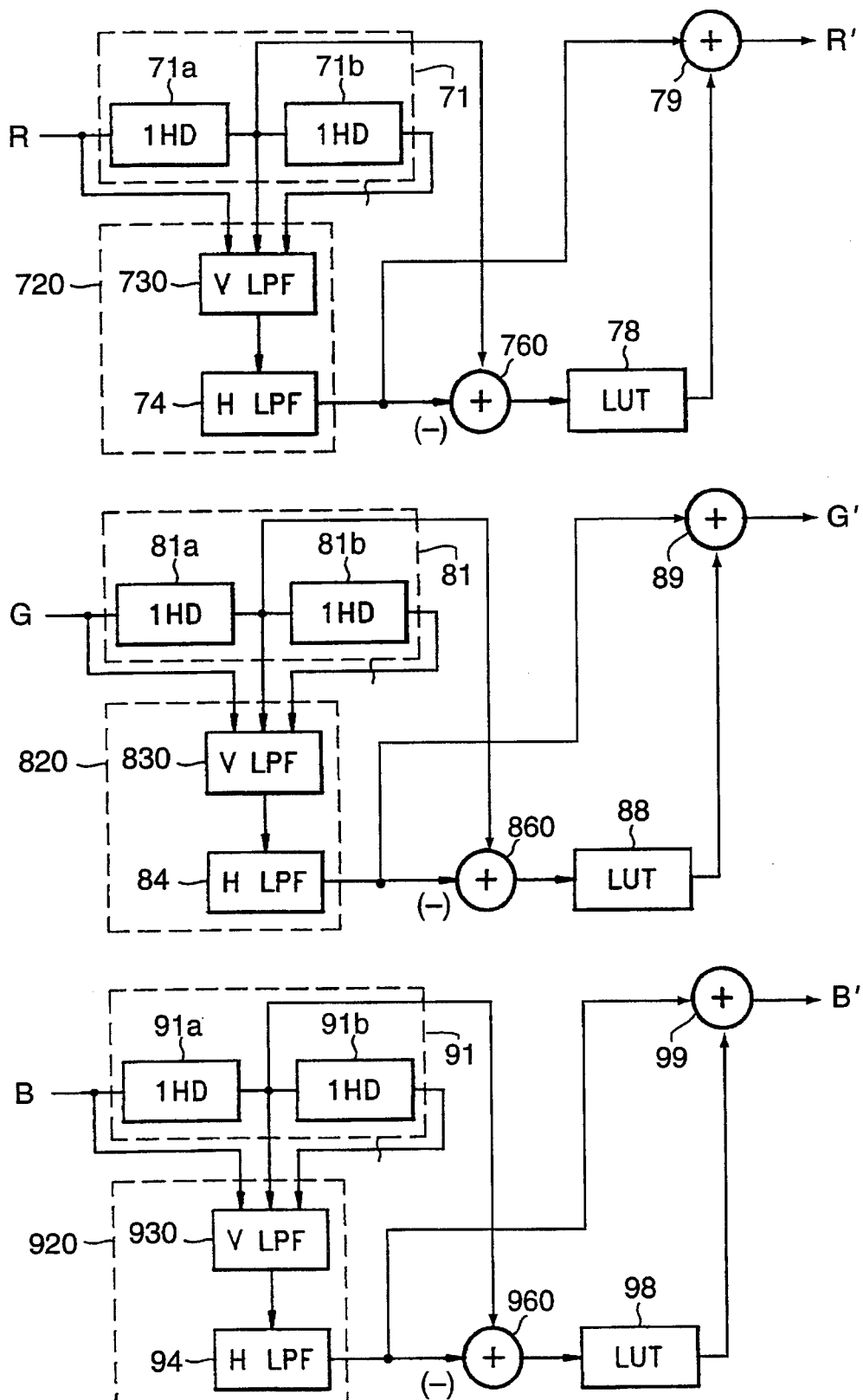
FIG. 12 is a block diagram of a modified FIG. 8 detail enhancement circuit that embodies the invention.

The FIG. 12 detail enhancement circuit is a modification of the FIG. 8 detail enhancement circuit, in which the spatial filter for separating detail information is simplified in accordance with the invention. The FIG. 12 circuit like the FIG. 8 circuit includes delay means 71, 81 and 91; horizontal/vertical detail component summing means 76, 86 and 96; read-only memories (ROMs) 78, 88 and 98 storing look-up tables (LUTs) used for canceling noise and for determining the amount of detail enhancement; and detail-enhanced signal supplying means 79, 89 and 99 for the red, green and blue channels, respectively. The vertical detail component extracting means 72, 82 and 92; the horizontal detail component extracting means 75, 85 and 95; and the detail component canceling means 77, 87 and 97 are dispensed with. A two-dimensional spatial lowpass filter 720 supplies detail-free red signal to the detail-enhanced signal supplying means 79 and to detail component extracting means 760. Similarly, a two-dimensional spatial lowpass filter 820 supplies detail-free green signal to the detail-enhanced signal supplying means 89 and to detail component extracting means 860; and a two-dimensional spatial lowpass filter 920 supplies detail-free blue signal to the detail-enhanced signal supplying means 99 and to detail component extracting means 960.

More particularly, the two-dimensional spatial lowpass filter 720 in the red channel comprises a weight-and-sum circuit 730 supplying a vertical lowpass filter response and a horizontal lowpass filter 740 supplying a two-dimensional spatial lowpass filter response to the vertical lowpass filter response from the circuit 730, the two-dimensional spatial lowpass filter 820 in the green channel comprises a weight-and-sum circuit 830 supplying a vertical lowpass filter response and a horizontal lowpass filter 840 supplying a two-dimensional spatial lowpass filter response to the vertical lowpass filter response from the circuit 830, and the two-dimensional spatial lowpass filter 920 in the blue channel comprises a weight-and-sum circuit 930 supplying a vertical lowpass filter response and a horizontal lowpass filter 940 supplying a two-dimensional spatial lowpass filter response to the vertical lowpass filter response from the circuit 930. The detail component extracting means 760 is a subtractor receiving the 1H-delayed R signal from the delay line 71a as a minuend input, receiving the two-dimensional spatial lowpass filter response from the filter 720 as a subtrahend input, and supplying its difference output to the ROM 78 as addressing input. Similarly, the detail component extracting means 860 is a subtractor receiving the 1H-delayed G signal from the delay line 81 a as a minuend input, receiving the two-dimensional spatial lowpass filter response from the filter 820 as a subtrahend input, and supplying its difference output to the ROM 88 as addressing input. Also, similarly, the detail component extracting means 960 is a subtractor receiving the 1H-delayed B signal from the delay line 91a as a minuend input, receiving the two-dimensional spatial lowpass filter response from the filter 920 as a subtrahend input, and supplying its difference output to the ROM 98 as addressing input.

In the respective detail enhancement circuitry shown in each of FIGS. 4, 8, 10 and 12, each of the red, green and blue channels employs only a single ROM storing a noise canceling and detail enhancement amount determining look-up table. However, depending on a user's intention, separate ROMs for storing a noise canceling look-up table and for storing a detail enhancement look-up table are provided for alternate use in each channel, with only one of the ROMs being selected to be used in accordance with signal conditions in the channel. To simplify the circuitry, the aforementioned signal processing may be used in only one or two of the channels.

Figure 13:
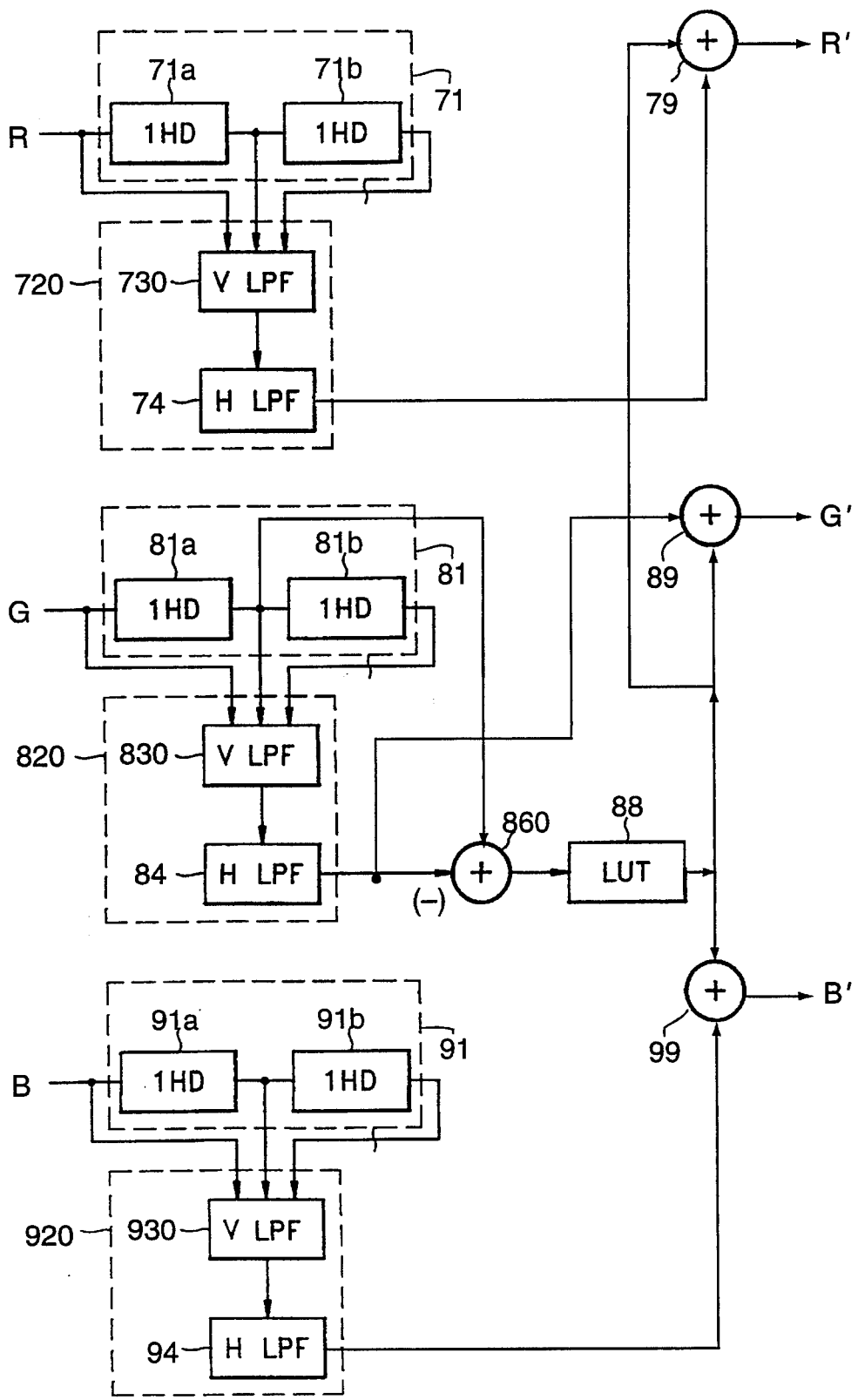
FIG. 13 is a block diagram of a modified FIG. 12 detail enhancement circuit that embodies the invention.

FIG. 13 shows a variant of the FIG. 12 detail enhancement circuitry, in which the ROMs 78 and 98 are dispensed with, and in which the ROM 88 supplies vertical and horizontal detail to each of the adders 79, 89 and 99. As in the detail enhancement circuitry of FIG. 1 or of FIG. 3 all vertical and horizontal detail is derived from the green channel; however, in the FIG. 13 detail enhancement circuitry, coring of high frequency noise is achieved under normal detail conditions as well as when detail is enhanced.

One skilled in the art will be enabled by the foregoing disclosure to practice the invention with color video processing using camera primary colors other than red, green and blue. In obvious equivalents of the detail enhancement circuitry described above, the look-up tables are such that the polarity of ROM read-out is reversed and the read-out is supplied as subtrahend input signal to a digital subtractor rather than as a summand to a digital adder; the claims are to be construed so as to include such obvious equivalents within their scopes.

What is claimed is:

1. Circuitry for enhancing detail in a first video signal having horizontal scan lines, said circuitry comprising:

first and second delay lines, each having a respective input port and having a respective output port for supplying a response to signal received at its said input port after a delay substantially equal to the period (1H) of one of said horizontal scan lines, the input port of said first delay line connected for receiving said first video signal and for supplying from its output port a 1H-delayed response to said first video signal, the input port of said second delay line connected for receiving said 1H-delayed response to said first video signal and for supplying from its output port a 2H-delayed response to said first video signal;

a first weight-and sum circuit connected for receiving said first video signal, said 1H-delayed response to said first video signal, and said 2H-delayed response to said first video signal and supplying a vertical lowpass filtered response to said first video signal;

a first horizontal lowpass filter, having an input port connected to receive from first weight-and-sum circuit said vertical lowpass filtered response to said first video signal, and having an output port;

a first subtractor connected for receiving minuend and subtrahend signals from separate ones of the output ports of said first delay line and said first horizontal lowpass filter and for supplying a first difference signal descriptive of separated detail from said first video signal;

a first read-only memory addressed by said first difference signal and storing a first look-up table of detail values; and means for combining detail values read from said first read-only memory with 1H-delayed response to said first video signal to generate a first enhanced-detail video signal.

2. Circuitry for enhancing detail in a first video signal, as set forth in claim 1, wherein said means for combining detail values read from said first read-only memory with said 1H-delayed response to said first video signal comprises a first adder for adding detail values read from said first read-only memory to said 1H-delayed response to said first video signal to generate said first enhanced-detail video signal.

3. Circuitry for enhancing detail in a first video signal, as set forth in claim 2, wherein said first video signal is descriptive of a first primary color component of a color image and is accompanied by second and third video signals descriptive of second and third primary color components respectively of said color image, said circuitry for enhancing detail further comprising:

means for supplying 1H-delayed responses to said second and third video signals;

a second adder for adding detail values read from said first read-only memory to said 1H-delayed response to said second video signal to generate a second enhanced-detail video signal; and a third adder for adding detail values read from said first read-only memory to said 1H-delayed response to said third video signal to generate a third enhanced-detail video signal.

4. Circuitry for enhancing detail in a first video signal, as set forth in claim 2, wherein for first read-only memory addresses where separated detail is larger in magnitude than an expected value of accompanying thermal noise said first read-only memory stores look-up table values of a magnitude and polarity such that said first enhanced-detail video signal exhibits detail enhancement, and wherein for first read-only memory addresses where separated detail is smaller in magnitude than said expected value of accompanying thermal noise said first read-only memory stores look-up table values of a magnitude and polarity such that said first enhanced-detail video signal exhibits detail suppression.

5. Circuitry for enhancing detail in a first video signal, as set forth in claim 1, wherein said first video signal is descriptive of a first primary color component of a color image and is accompanied by second and third video signals descriptive of second and third primary color components respectively of said color image, in combination with circuitry for enhancing detail in said second and third video signals comprising:

third and fourth delay lines, each having a respective input port and having a respective output port for supplying a response to signal received at its said input port after a delay substantially equal to the period (1H) of one of said horizontal scan lines, the input port of said third delay line connected for receiving said second video signal and for supplying from its output port a 1H-delayed response to said second video signal, the input port of said fourth delay line connected for receiving said 1H-delayed response to said second video signal and for supplying from its output port a 2H-delayed response to said second video signal;

a second weight-and sum circuit connected for receiving said second video signal, said 1H-delayed response to said second video signal, and said 2H-delayed response to said second video signal and supplying a vertical lowpass filtered response to said second video signal;

a second horizontal lowpass filter, having an input port connected to receive from second weight-and sum circuit said vertical lowpass filtered response to said second video signal, and having an output port;

a second subtractor connected for receiving minuend and subtrahend signals from separate ones of the output ports of said third delay line and said second horizontal lowpass filter and for supplying a second difference signal descriptive of separated detail from said second video signal;

a second read-only memory addressed by said second difference signal and storing a second look-up table of detail values;

means for combining detail values read from said second read-only memory with 1H-delayed response to said second video signal to generate a second enhanced-detail video signal;

fifth and sixth delay lines, each having a respective input port and having a respective output port for supplying a response to signal received at its said input port after a delay substantially equal to the period (1H) of one of said horizontal scan lines, the input port of said fifth delay line connected for receiving said third video signal and for supplying from its output port a 1H-delayed response to said third video signal, the input port of said sixth delay line connected for receiving said 1H-delayed response to said third video signal and for supplying from its output port a 2H-delayed response to said third video signal;

a third weight-and sum circuit connected for receiving said third video signal, said 1H-delayed response to said third video signal, and said 2H-delayed response to said third video signal and supplying a vertical lowpass filtered response to said third video signal;

a third horizontal lowpass filter, having an input port connected to receive from third weight-and sum circuit said vertical lowpass filtered response to said third video signal, and having an output port;

a third subtractor connected for receiving minuend and subtrahend signals from separate ones of the output ports of said fifth delay line and said third horizontal lowpass filter and for supplying a third difference signal descriptive of separated detail from said third video signal;

a third read-only memory addressed by said third difference signal and storing a third look-up table of detail values; and means for combining detail values read from said third read-only memory with 1H-delayed response to said third video signal to generate a third enhanced-detail video signal.

6. Circuitry for enhancing detail in said first, second and third video signals, as set forth in claim 5, wherein said means for combining detail values read from said first read-only memory with said 1H-delayed response to said first video signal comprises a first adder for adding detail values read from said first read-only memory to said 1H-delayed response to said first video signal to generate said first enhanced-detail video signal, wherein said means for combining detail values read from said second read-only memory with said 1H-delayed response to said second video signal comprises a second adder for adding detail values read from said second read-only memory to said 1H-delayed response to said second video signal to generate said second enhanced-detail video signal, and wherein said means for combining detail values read from said third read-only memory with said 1H-delayed response to said third video signal comprises a third adder for adding detail values read from said third read-only memory to said 1H-delayed response to said third video signal to generate said third enhanced-detail video signal.

7. Circuitry for enhancing detail in said first, second and third video signals, as set forth in claim 6, wherein, for first read-only memory addresses where separated detail is larger in magnitude than an expected value of accompanying first thermal noise, said first read-only memory stores first look-up table values of a magnitude and polarity such that said first enhanced-detail video signal exhibits detail enhancement; wherein, for said first read-only memory addresses where separated detail is smaller in magnitude than said expected value of said first thermal noise, said first read-only memory stores further first look-up table values of a magnitude and polarity such that said first enhanced-detail video signal exhibits detail suppression; wherein, for second read-only memory addresses where separated detail is larger in magnitude than an expected value of accompanying second thermal noise, said second read-only memory stores second look-up table values of a magnitude and polarity such that said second enhanced-detail video signal exhibits detail enhancement; wherein, for said second read-only memory addresses where separated detail is smaller in magnitude than said expected value of said second thermal noise, said second read-only memory stores further second look-up table values of a magnitude and polarity such that said second enhanced-detail video signal exhibits detail suppression; wherein for third read-only memory addresses where separated detail is larger in magnitude than an expected value of accompanying third thermal noise said third read-only memory stores third look-up table values of a magnitude and polarity such that said third enhanced-detail video signal exhibits detail enhancement; and wherein, for said third read-only memory addresses where separated detail is smaller in magnitude than said expected value of said third thermal noise, said third read-only memory stores further third look-up table values of a magnitude and polarity such that said third enhanced-detail video signal exhibits detail suppression.

8. Circuitry for coring high frequency noise in a first video signal having horizontal scan lines, said circuitry comprising:

first and second delay lines, each having a respective input port and having a respective output port for supplying a response to signal received at its said input port after a delay substantially equal to the period (1H) of one of said horizontal scan lines, the input port of said first delay line connected for receiving said first video signal and for supplying from its output port a 1H-delayed response to said first video signal, the input port of said second delay line connected for receiving said 1H-delayed response to said first video signal and for supplying from its output port a 2H-delayed response to said first video signal;

a first weight-and sum circuit connected for receiving said first video signal, said 1H-delayed response to said first video signal, and said 2H-delayed response to said first video signal and supplying a vertical lowpass filtered response to said first video signal;

a first horizontal lowpass filter, having an input port connected to receive from first weight-and sum circuit said vertical lowpass filtered response to said first video signal, and having an output port for supplying horizontal and vertical lowpass filtered response to said first video signal;

a first subtractor connected for receiving minuend and subtrahend signals from separate ones of the output ports of said first delay line and said first horizontal lowpass filter and for supplying a first difference signal descriptive of separated detail from said first video signal;

means for coring said first difference signal to generate a first cored detail signal; and means for combining said first cored detail signal with said horizontal and vertical lowpass filtered response to said first video signal from said output port of said first horizontal lowpass filter to generate a first cored-highs video signal.

9. Circuitry for coring high frequency noise in a first video signal, as set forth in claim 8, wherein said means for combining said first cored detail signal with said horizontal and vertical lowpass filtered response to said first video signal from said output port of said first horizontal lowpass filter to generate a first cored-highs video signal comprises a first adder for adding said first cored detail signal from said means for coring said first difference signal to said horizontal and vertical lowpass filtered response to said first video signal from said output port of said first horizontal lowpass filter, thus to generate said first cored-highs video signal.

10. Circuitry for coring high frequency noise in a first video signal, as set forth in claim 9 wherein said means for coring said first difference signal to generate a first cored detail signal comprises a first read-only memory addressed by said first difference signal and storing a first look-up table of detail values read to said first adder.

11. Circuitry for coring high frequency noise in a first video signal, as set forth in claim 10, further comprising;

a second read-only memory addressed by said first cored detail signal and storing a second look-up table of detail values; and a second adder for adding detail values read from said second read-only memory to said first cored-highs video signal from said first adder to generate a first enhanced-detail video signal.

12. Circuitry for coring high frequency noise in a first video signal, as set forth in claim 8, wherein said first video signal is descriptive of a first primary color component of a color image and is accompanied by second and third video signals descriptive of second and third primary color components respectively of said color image, in combination with circuitry for coring high frequency noise in said second and third video signals;

third and fourth delay lines, each having a respective input port and having a respective output port for supplying a response to signal received at its said input port after a delay substantially equal to the period (1H) of one of said horizontal scan lines, the input port of said third delay line connected for receiving said second video signal and for supplying from its output port a 1H-delayed response to said second video signal, the input port of said second delay line connected for receiving said 1H-delayed response to said second video signal and for supplying from its output port a 2H-delayed response to said second video signal;

a second weight-and sum circuit connected for receiving said second video signal, said 1H-delayed response to said second video signal, and said 2H-delayed response to said second video signal and supplying a vertical lowpass filtered response to said second video signal;

a second horizontal lowpass filter, having an input port connected to receive from second weight-and sum circuit said vertical lowpass filtered response to said second video signal, and having an output port for supplying horizontal and vertical lowpass filtered response to said second video signal;

a second subtractor connected for receiving minuend and subtrahend signals from separate ones of the output ports of said third delay line and said second horizontal lowpass filter and for supplying a second difference signal descriptive of separated detail from said second video signal;

means for coring said second difference signal to generate a second cored detail signal;

means for combining said second cored detail signal with said horizontal and vertical lowpass filtered response to said second video signal from said output port of said second horizontal lowpass filter to generate a second cored-highs video signal;

fifth and sixth delay lines, each having a respective input port and having a respective output port for supplying a response to signal received at its said input port after a delay substantially equal to the period (1H) of one of said horizontal scan lines, the input port of said fifth delay line connected for receiving said third video signal and for supplying from its output port a 1H-delayed response to said third video signal, the input port of said sixth delay line connected for receiving said 1H-delayed response to said third video signal and for supplying from its output port a 2H-delayed response to said third video signal;

a third weight-and sum circuit connected for receiving said third video signal, said 1H-delayed response to said third video signal, and said 2H-delayed response to said third video signal and supplying a vertical lowpass filtered response to said third video signal;

a third horizontal lowpass filter, having an input port connected to receive from third weight-and sum circuit said vertical lowpass filtered response to said third video signal, and having an output port for supplying horizontal and vertical lowpass filtered response to said third video signal;

a third subtractor connected for receiving minuend and subtrahend signals from separate ones of the output ports of said fifth delay line and said third horizontal lowpass filter and for supplying a third difference signal descriptive of separated detail from said third video signal;

means for coring said third difference signal to generate a third cored detail signal; and means for combining said third cored detail signal with said horizontal and vertical lowpass filtered response to said third video signal from said output port of said third horizontal lowpass filter to generate a third cored-highs video signal.

13. Circuitry for coring high frequency noise in first, second and third video signals, as set forth in claim 12, wherein said means for combining said first cored detail signal with said horizontal and vertical lowpass filtered response to said first video signal comprises a first adder for adding said first cored detail signal to said horizontal and vertical lowpass filtered response to said first video signal from said output port of said first horizontal lowpass filter to generate a first cored-highs video signal, wherein said means for combining said second cored detail signal with said horizontal and vertical lowpass filtered response to said second video signal comprises a second adder for adding said second cored detail signal to said horizontal and vertical lowpass filtered response to said second video signal from said output port of said second horizontal llowpass filter to generate a second cored-highs video signal, and wherein said means for combining said third cored detail signal with said horizontal and vertical lowpass filtered response to said third video signal comprises a third adder for adding said third cored detail signal to said horizontal and vertical lowpass filtered response to said third video signal from said output port of said third horizontal lowpass filter to generate a third cored-highs video signal.

14. Circuitry for coring high frequency noise in first, second and third video signals, as set forth in claim 13, wherein first read-only memory addressed by said first, second and third difference signals provides said means for coring said first difference signal to generate a first cored detail signal, said means for coring said second difference signal to generate a second cored detail signal, and said means for coring said third difference signal to generate a third cored detail signal.

15. Circuitry for coring high frequency noise in first, second and third video signals, as set forth in claim 14, further comprising:

second read-only memory addressed by said first, second and third cored detail signals and storing a look-up table of detail values;

a fourth adder for adding detail values read from said second read-only memory to said first cored-highs video signal from said first adder to generate a first enhanced-detail video signal;

a fifth adder for adding detail values read from said second read-only memory to said second cored-highs video signal from said second adder to generate a second enhanced-detail video signal; and a sixth adder for adding detail values read from said second read-only memory to said third cored-highs video signal from said third adder to generate a third enhanced-detail video signal.

16. Circuitry for coring high frequency noise in first, second and third video signals, as set forth in claim 13, further comprising:

read-only memory addressed by said first, second and third cored detail signals and storing a look-up table of detail values;

a fourth adder for adding detail values read from said read-only memory to said first cored-highs video signal from said first adder to generate a first enhanced-detail video signal;

a fifth adder for adding detail values read from said read-only memory to said second cored-highs video signal from said second adder to generate a second enhanced-detail video signal; and a sixth adder for adding detail values read from said read-only memory to said third cored-highs video signal from said third adder to generate a third enhanced-detail video signal.

17. Circuitry for enhancing detail in a first video signal having horizontal scan lines, said circuitry comprising:

first and second delay lines, each having a respective input port and having a respective output port for supplying a response to signal received at its said input port after a delay substantially equal to the period (1H) of one of said horizontal scan lines, the input port of said first delay line connected for receiving said first video signal and for supplying from its output port a 1H-delayed response to said first video signal, the input port of said second delay line connected for receiving said 1H-delayed response to said first video signal and for supplying from its output port a 2H-delayed response to said first video signal;

a first weight-and sum circuit connected for receiving said first video signal, said 1H-delayed response to said first video signal, and said 2H-delayed response to said first video signal and supplying a vertical lowpass filtered response to said first video signal;

a first horizontal lowpass filter, having an input port connected to receive from first weight-and sum circuit said vertical lowpass filtered response to said first video signal, and having an output port for supplying horizontal and vertical lowpass filtered response to said first video signal;

a first subtractor connected for receiving minuend and subtrahend signals from separate ones of the output ports of said first delay line and said first horizontal lowpass filter and for supplying a first difference signal descriptive of separated detail from said first video signal;

a first read-only memory addressed by said first difference signal and storing a look-up table of detail values; and means for combining detail values read from said first read-only memory with said horizontal and vertical lowpass filtered response to said first video signal from said output port of said first horizontal lowpass filter to generate a first enhanced-detail video signal.

18. Circuitry for enhancing detail, as set forth in claim 17, wherein said means for combining detail values read from said first read-only memory with said horizontal and vertical lowpass filtered response to said first video signal comprises a first adder for adding detail values read from said first read-only memory to said horizontal and vertical low-pass filtered response to said first video signal from said output port of said 1first horizontal lowpass filter, thus to generate said first enhanced-detail video signal.

19. Circuitry for enhancing detail, as set forth in claim 18, wherein, for first read-only memory addresses where separated detail is larger in magnitude than an expected value of accompanying thermal noise, said first read-only memory stores look-up table values of a magnitude and polarity such that said first enhanced-detail video signal exhibits detail enhancement; and wherein, for first read-only memory addresses where separated detail is smaller in magnitude than said expected value of thermal noise, said first read-only memory stores look-up table values of zero so that said first enhanced-detail video signal exhibits detail suppression.

20. Circuitry for enhancing detail in a first video signal, as set forth in claim 17, wherein said first video signal is descriptive of a first primary color component of a color image and is accompanied by second and third video signals descriptive of second and third primary color components respectively of said color image, in combination with circuitry for enhancing detail in said second and third video signals comprising:

third and fourth delay lines, each having a respective input port and having a respective output port for supplying a response to signal received at its said input port after a delay substantially equal to the period (1H) of one of said horizontal scan lines, the input port of said third delay line connected for receiving said second video signal and for supplying from its output port a 1H-delayed response to said second video signal, the input port of said fourth delay line connected for receiving said 1H-delayed response to said second video signal and for supplying from its output port a 2H-delayed response to said second video signal;

a second weight-and sum circuit connected for receiving said second video signal, said 1H-delayed response to said second video signal, and said 2H-delayed response to said second video signal and supplying a vertical lowpass filtered response to said second video signal;

a second horizontal lowpass filter, having an input port connected to receive from second weight-and sum circuit said vertical lowpass filtered response to said second video signal, and having an output port for supplying horizontal and vertical lowpass filtered response to said second video signal;

a second subtractor connected for receiving minuend and subtrahend signals from separate ones of the output ports of said third delay line and said second horizontal lowpass filter and for supplying a second difference signal descriptive of separated detail from said second video signal;

a second read-only memory addressed by said second difference signal and storing a second look-up table of detail values;

means for combining detail values read from said second read-only memory with said horizontal and vertical llowpass filtered response to said second video signal from said output port of said second horizontal lowpass filter to generate a second enhanced-detail video signal;

fifth and sixth delay lines, each having a respective input port and having a respective output port for supplying a response to signal received at its said input port after a delay substantially equal to the period (1H) or one of said horizontal scan lines, the input port of said fifth delay line connected for receiving said third video signal and for supplying from its output port a 1H-delayed response to said third video signal, the input port of said sixth delay line connected for receiving said 1H-delayed response to said third video signal and for supplying from its output port a 2H-delayed response to said third video signal;

a third weight-and sum circuit connected for receiving said third video signal, said 1H-delayed response to said third video signal, and said 2H-delayed response to said third video signal and supplying a vertical lowpass filtered response to said third video signal;

a third horizontal lowpass filter, having an input port connected to receive from third weight-and sum circuit said vertical low-pass filtered response to said third video signal, and having an output port for supplying horizontal and vertical lowpass filtered response to said third video signal;

a third subtractor connected for receiving minuend and subtrahend signals from separate ones of the output ports of said fifth delay line and said third horizontal lowpass filter and for supplying a third difference signal descriptive of separated detail from said third video signal;

a third read-only memory addressed by said third difference signal and storing a third look-up table of detail values; and means for combining detail values read from said third read-only memory with said horizontal and vertical lowpass filtered response to said third video signal from said output port of said third horizontal lowpass filter to generate a third enhanced-detail video signal.

21. Circuitry for enhancing detail in said first, second and third video signals, as set forth in claim 20, wherein said means for combining detail values read from said first read-only memory with said horizontal and vertical lowpass filtered response to said first video signal comprises a first adder for adding detail values read from said first read-only memory to said horizontal and vertical lowpass filtered response to said first video signal from said output port of said first horizontal lowpass filter to generate said first enhanced-detail video signal, wherein said means for combining detail values read from said second read-only memory with said horizontal and vertical lowpass filtered response to said second video signal comprises a second adder for adding detail values read from said second read-only memory to said horizontal and vertical lowpass filtered response to said second video signal from said output port of said second horizontal lowpass filter to generate said second enhanced-detail video signal, and wherein said means for combining detail values read from said third read-only memory with said horizontal and vertical lowpass filtered response to said third video signal comprises a third adder for adding detail values read from said third read-only memory to said horizontal and vertical lowpass filtered response to said third video signal from said output port of said third horizontal lowpass filter to generate said third enhanced-detail video signal.

22. Circuitry for enhancing detail in said first, second and third video signals, as set forth in claim 21, wherein, for first read-only memory addresses where separated detail is larger in magnitude than an expected value of accompanying first thermal noise, said first read-only memory stores first look-up table values such that said first enhanced-detail video signal exhibits detail enhancement; wherein, for first read-only memory addresses where separated detail is smaller in magnitude than said expected value of first thermal noise, said first read-only memory stores further first look-up table values of zero, so that said first enhanced-detail video signal exhibits detail suppression; wherein, for second read-only memory addresses where separated detail is larger in magnitude than an expected value of accompanying second thermal noise, said second read-only memory stores second look-up table values such that said second enhanced-detail video signal exhibits detail enhancement; wherein, for second read-only memory addresses where separated detail is smaller in magnitude than said expected value of second thermal noise, said second read-only memory stores further second look-up table values of zero, so that said second enhanced-detail video signal exhibits detail suppression; wherein, for third read-only memory addresses where separated detail is larger in magnitude than an expected value of accompanying third thermal noise, said third read-only memory stores third look-up table values such that said third enhanced-detail video signal exhibits detail enhancement; and wherein, for third read-only memory addresses where separated detail is smaller in magnitude than said expected value of third thermal noise, said third read-only memory stores further third look-up table values of zero, so that said third enhanced-detail video signal exhibits detail suppression.

23. Circuitry for enhancing detail in a first video signal, as set forth in claim 17, wherein said first video signal is descriptive of a first primary color component of a color image and is accompanied by second and third video signals descriptive of second and third primary color components respectively of said color image, in combination with circuitry for enhancing detail in said second and third video signals comprising:

third and fourth delay lines, each having a respective input port and having a respective output port for supplying a response to signal received at its said input port after a delay substantially equal to the period (1H) of one of said horizontal scan lines, the input port of said third delay line connected for receiving said second video signal and for supplying from its output port a 1H-delayed response to said second video signal, the input port of said second delay line connected for receiving said 1H-delayed response to said second video signal and for supplying from its output port a 2H-delayed response to said second video signal;

a second weight-and sum circuit connected for receiving said second video signal, said 1H-delayed response to said second video signal, and said 2H-delayed response to said second video signal and supplying a vertical lowpass filtered response to said second video signal;

a second horizontal lowpass filter, having an input port connected to receive from second weight-and sum circuit said vertical lowpass filtered response to said second video signal, and having an output port tier supplying horizontal and vertical lowpass filtered response to said second video signal;

means for combining detail values read from said first read-only memory with said horizontal and vertical lowpass filtered response to said second video signal from said output port of said second horizontal lowpass filter to generate a second enhanced-detail video signal;

fifth and sixth delay lines, each having a respective input port and having a respective output port for supplying a response to signal received at its said input port after a delay substantially equal to the period (1H) of one of said horizontal scan lines, the input port of said fifth delay line connected for receiving said third video signal and for supplying from its output port a 1H-delayed response to said third video signal, the input port of said sixth delay line connected for receiving said 1H-delayed response to said third video signal and for supplying from its output port a 2H-delayed response to said third video signal;

a third weight-and sum circuit connected for receiving said third video signal, said 1H-delayed response to said third video signal, and said 2H-delayed response to said third video signal and supplying a vertical lowpass filtered response to said third video signal;

a third horizontal lowpass filter, having an input port connected to receive from third weight-and sum circuit said vertical lowpass filtered response to said third video signal, and having an output port for supplying horizontal and vertical lowpass filtered response to said third video signal; and means for combining detail values read from said first read-only memory with said horizontal and vertical lowpass filtered response to said third video signal from said output port of said third horizontal lowpass filter to generate a third enhanced-detail video signal.

24. Circuitry for enhancing detail in said first, second and third video signals, as set forth in claim 23, wherein said means for combining detail values read from said first read-only memory with said horizontal and vertical lowpass filtered response to said first video signal comprises a first adder for adding detail values read from said first read-only memory to said horizontal and vertical lowpass filtered response to said first video signal from said output port of said first horizontal lowpass filter to generate said first enhanced-detail video signal, wherein said means for combining detail values read from said first read-only memory with said horizontal and vertical lowpass filtered response to said second video signal comprises a second adder for adding detail values read from said first read-only memory to said horizontal and vertical lowpass filtered response to said second video signal from said output port of said second horizontal lowpass filter to generate said second enhanced-detail video signal, and wherein said means for combining detail values read from said first read-only memory with said horizontal and vertical lowpass filtered response to said third video signal comprises a third adder for adding detail values read from said read-only memory to said horizontal and vertical lowpass filtered response to said third video signal from said output port of said third horizontal lowpass filter to generate said third enhanced-detail video signal.

25. Circuitry for enhancing detail in said first, second and third video signals, as set forth in claim 24, wherein, for first read-only memory addresses where separated detail is larger in magnitude than an expected value of accompanying thermal noise, said first read-only memory stores look-up table values such that said first, second and third enhanced-detail video signals exhibit detail enhancement; and wherein, for first read-only memory addresses where separated detail is smaller in magnitude than said expected value of accompanying thermal noise, said first read-only memory stores further look-up table values of zero, so that said first, second and third enhanced-detail video signals exhibit detail suppression.

* * * * *